United States Patent [19]
Wimble

[11] Patent Number: 5,812,850
[45] Date of Patent: Sep. 22, 1998

[54] OBJECT-ORIENTED SYMBOLIC DEBUGGER USING A COMPILER DRIVEN DATABASE AND STATE MODELING TO CONTROL PROGRAM EXECUTION

[75] Inventor: Michael D. Wimble, Sunnyvale, Calif.

[73] Assignee: Object Technology Licensing Corp., Cupertino, Calif.

[21] Appl. No.: 557,993

[22] Filed: Nov. 13, 1995

[51] Int. Cl.$^6$ ........................ G06F 9/45
[52] U.S. Cl. ........................ 395/704
[58] Field of Search ........................ 395/701, 705, 395/709, 704, 183.13, 183.14

[56] References Cited

U.S. PATENT DOCUMENTS

| | | | |
|---|---|---|---|
| 4,720,778 | 1/1988 | Hall et al. | 395/183.14 |
| 4,821,220 | 4/1989 | Duisberg | 364/578 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,181,162 | 1/1993 | Smith et al. | 364/419 |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/701 |
| 5,327,562 | 7/1994 | Adcock | 395/700 |
| 5,339,430 | 8/1994 | Lundin et al. | 395/700 |
| 5,339,438 | 8/1994 | Conner et al. | 395/700 |
| 5,379,423 | 1/1995 | Mutoh et al. | 395/701 |
| 5,379,431 | 1/1995 | Lemon et al. | 395/652 |
| 5,414,854 | 5/1995 | Heninger et al. | 395/651 |

(List continued on next page.)

OTHER PUBLICATIONS

Dumas, Joseph and Paige Parsons. "Discovering the Way Programmers Think: New Programming Environments." *Communications of the ACM.* Jun. 1995: pp. 45–56.

Pascoe, Geoffrey A. "Encapsulators: A New Software Paradigm in Smalltalk-80." *OOPSLA '86 Proceedings.* Sep. 1986: pp. 341–346.

Purtilo, James M. and Joanne M. Atlee. "Module Reuse by Interface Adaptation." *Software—Practice and Experience.* Jun. 1991: pp. 539–556.

Lam, Siman S. "Protocol Conversion." *IEEE Transactions on Software Engineering.* Mar. 1988: pp. 353–362.

Thatte, Satish R. "Automated Synthesis of Interface Adapters for Reusable Classes." *POPL '94.* Jan. 1994: pp. 174–187.

Yellin, Daniel M. and Robert E. Strom. "Interfaces, Protocols, and the Semi-Automatic Construction of Software Adaptors." *OOPSLA '94.* Oct. 1994: pp. 176–190.

Jacobson, Ivar and Fredrik Lindstrom. "Re-engineering of old systems to an object-oriented architecture." *OOPSLA '91.* pp. 340–350.

(List continued on next page.)

Primary Examiner—Emanuel Todd Voeltz
Assistant Examiner—Peter J. Corcoran, III
Attorney, Agent, or Firm—Kudirka & Jobse

[57] ABSTRACT

A human oriented object programming system provides an interactive and dynamic process for debugging computer programs which facilitates the development of complex computer programs such as operating systems and large applications with graphic user interfaces (GUIs). The debugging system uses a database of information relating machine executable code to source code. The database is developed during the compilation process using an extensible object-oriented set of tools. The tools standardize the information developed during compilation into an information format which the debugging system can utilize to provide the user with a powerful source code view of the corresponding executing code.

66 Claims, 19 Drawing Sheets

U.S. PATENT DOCUMENTS

| | | | |
|---|---|---|---|
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,490,249 | 2/1996 | Miller | 395/183.14 |
| 5,519,866 | 5/1996 | Lawrence et al. | 395/710 |

OTHER PUBLICATIONS

Filman, Robert E. "Retrofitting Objects." *OOPSLA '87*. Oct. 1987: pp. 342–353.

Dietrich, Walter C., Lee R. Nackman and Franklin Gracer. "Saving a Legacy with Objects." *OOPSLA '89*. Oct. 1989: 77–83.

Dotts, Alan and Don Birkley. "Development of Reusable Test Equipment Software Using Smalltalk and C." *OOPSLA '92*. Oct. 1992: pp. 31–35.

Duntemann, Jeff and Chris Marinacci. "New Objects for Old Structures." *BYTE*. Apr. 1990: pp. 261–266.

Alabiso, Bruno, "Transformation of Data Flow Analysis Models to Object–Oriented Design." *OOPSLA '88*. Sep. 1988: pp. 335–353.

Madhavji, Nazim H., Jules Desharnais, Luc Pinsonneault, and Kamel Toubache. "Adapting Modules to an Integrated Programming Environment." *IEEE International Conference on Programming Languages*. 1988: pp. 364–371.

Dutt, Nikil D. "Legend: A Language for Generic Component Library Description." *IEEE International Conference on Computer Languages*. 1990: 198–207.

TOKEN MAP

| KEY (610) | SOURCE (620) | KIND (630) | TYPE MAP KEY (640) | DATA MAP KEY (650) |
|---|---|---|---|---|
| 1 | INT | TYPE NAME | -1 | |
| 2 | FOO | FUNCTION NAME | | -1 |
| 3 | ( | LEFT PARENTHESIS | | |
| 4 | CHAR | TYPE NAME | -2 | |
| 5 | A | VARIABLE NAME | -2 | -3 |
| 6 | ) | RIGHT PARENTHESIS | | |

FIG. 13

DATA MAP

| KEY | VARIABLE | PC LOCATION | READ FORMULA | WRITE FORMULA | OPTIMIZATION ANNOTATION | LOCATION |
|---|---|---|---|---|---|---|
| -3 | A | 0..0 | DIRECT | DIRECT | | 1(SP) |
| | | 1..1 | DIRECT | DIRECT | | 2(SP) |
| | | 2..16 | DIRECT | DIRECT | | 2(FP) |
| | | 17..17 | DIRECT | DIRECT | | 1(SP) |
| -1 | FOO | 6..6 | DIRECT | DIRECT | 1 | R1 |
| | | 8..17 | DIRECT | DIRECT | 1 | R1 |
| 1 | YES | 6..6 | DIRECT | DIRECT | 2 | R1 |
| | | 8..17 | DIRECT | DIRECT | 2 | R1 |

1. SHARED LIFETIME WITH 'YES'.
2. SHARED LIFETIME WITH 'FOO'.

FIG. 15

STATEMENT MAP

| KEY | KIND | PARENT | BREAKPOINT | SOURCE |
|-----|------|--------|------------|--------|
| 1 | DEFINITION | 11 | 2 | BOOL YES=A=='Y'; |
| 2 | IF_EXPRESSION | 10 | 9 | (YES) |
| 3 | FUNCTION_CALL | 5 | 8 | PRINTF("%C=OK\N",A); |
| 4 | RETURN | 5 | 16 | RETURN YES; |
| 5 | BLOCK | 10 | 8 | {PRINTF("%C=OK\N",A); RETURN YES;} |
| 6 | FUNCTION_CALL | 8 | 8 | PRINTF("%C=NO\N",A); |
| 7 | RETURN | 8 | 16 | RETURN YES; |
| 8 | BLOCK | 9 | 8 | {PRINTF("%C=NO\N",A); RETURN YES;} |
| 9 | IF_ELSE | 10 | 8 | ELSE{PRINTF("%C=NO\N",A); RETURN YES;} |
| 10 | IF_STATEMENT | 11 | 8 | IF(YES){...}ELSE{...} |
| 11 | FUNCTION | 0 | 0 | INT FOO(CHAR A) {...} |

670 KEY  671 KIND  672 PARENT  673 BREAKPOINT  674 SOURCE

FIG. 17

84 ⌒ SOURCE REFERENCE

1. Character Range in Property x of Component y
2. Set of: Character Range in Property x of Component y
3. Token Map Entry
4. Token Map Range
5. Token Map Entry Set

FIG. 18

86 ⌒ DATA LOCATIONS

Data Value Address
Data Map Entry

FIG. 19

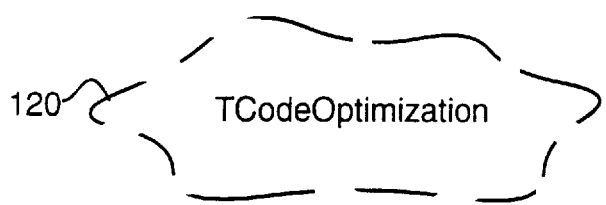
FIG. 21
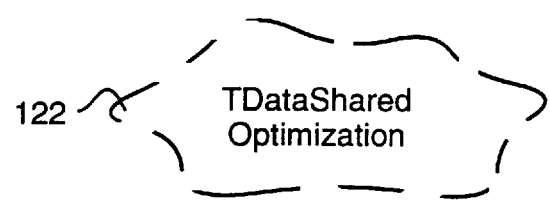
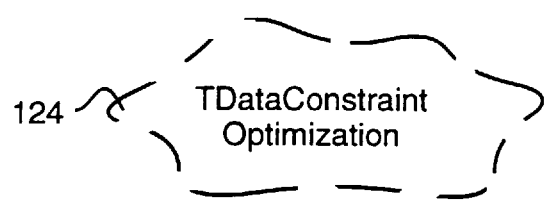
FIG. 22

OBJECT-ORIENTED SYMBOLIC DEBUGGER USING A COMPILER DRIVEN DATABASE AND STATE MODELING TO CONTROL PROGRAM EXECUTION

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention generally relates to Computer Aided Software Engineering (CASE) and, more particularly, to a debugging system which provides an interactive and dynamic environment for computer program debugging.

Description of the Prior Art

Object-oriented programming (OOP) is the preferred environment for building user-friendly, intelligent computer software. Key aspects of OOP are data encapsulation, inheritance and polymorphism. These elements may be used to generate a graphical user interface (GUI), typically characterized by a windowing environment having icons, mouse cursors and menus. While these three key aspects are common to OOP languages, most OOP languages implement the three key aspects differently.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The developer does not need to be concerned with the type of data; rather, the developer need only be concerned with creating the right order of a message and using the right message. C++ was developed by Bjarne Stroustrup at the AT&T Bell Laboratories in 1983 as an extension of C. The key concept of C++ is class, which is a user-defined type. Classes provide object-oriented programming features. C++ modules are compatible with C modules and can be linked freely so that existing C libraries may be used with C++ programs.

The complete process of running a computer program involves translation of the source code written by the developer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code prior to running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or address space until an object is implemented.

A compiler comprises three parts; the lexical analyzer, the syntax analyzer, and the code generator. The input to the lexical analyzer is a sequence of characters representing a high-level language program. The lexical analyzer divides this sequence into a sequence of tokens that are input to the syntax analyzer. The syntax analyzer divides the tokens into instructions and, using a database of grammatical rules, determines whether or not each instruction is grammatically correct. If not, error messages are produced. If correct, the instruction is decomposed into a sequence of basic instructions that are transferred to the code generator to produce a low-level language. The code generator is itself typically divided into three parts; intermediate code generation, code optimization, and code generation. Basically, the code generator accepts the output from the syntax analyzer and generates the machine language code.

To aid in the development of software, incremental compilers have been developed in which the compiler generates code for a statement or a group of statements as received, independent of the code generated later for other statements, in a batch processing operation. The advantage of incremental compiling is that code may be compiled and tested for parts of a program as it is written, rather than requiring the debugging process to be postponed until the entire program has been written. However, even traditional incremental compilers must reprocess a complete module each time.

Optimizing compilers produce highly optimized object code which, in many cases, makes debugging at the source level more difficult than with a non-optimizing compiler. The problem lies in the fact that although a routine will be compiled to give the proper answer, the exact way it computes that answer may be significantly different from that described in the source code. Some things that the optimizing compiler may do include eliminating code or variables known not to affect the final result, moving invariant code out of loops, combining common code, reusing registers allocated to variables when the variable is no longer needed, etc. Thus, mapping from source to object code and vice versa can be difficult given some of these optimizations. Inspecting the values of variables can be difficult since the value of the variable may not always be available at any location within the routine. Modifying the values of variables in optimized code is especially difficult, if not impossible. Unless specifically declared as volatile, the compiler "remembers" values assigned to variables and may use the "known" value later in the code without rereading the variable. A change in that value could, therefore, produce erroneous program results.

While there have been many advances in the art of computer program building, testing and developing, the known software development tools still place a substantial burden on the developer, often requiring insightful intuition. In addition, traditional batch oriented programming systems provide for very long edit-compile-test cycles which is very disruptive to the creative act of programming.

There has been some research in various small aspects of debugging, such as solving specific problems inherent in debugging code which has been "optimized" in various ways, or in using different paradigms in the debugger engine.

Several basic problems of debugging still exist, namely: Debugging, as a practice, is still in large part an art instead of being predominately an engineering science; debugging represents a large component of the time and money required to create and maintain software; programs have grown in complexity in recent years but debuggers have not evolved to help manage that complexity; compilers have evolved in their ability to optimize code but debuggers have not evolved to the same extent to adequately debug that optimized code; and, typical debuggers provide no special support for the newer software paradigms, such as distributed computing and client/server architectures.

With current software practices, and the inadequacies of typical debuggers, any improvement in the debugger tool will likely have a large payback. The debugger disclosed herein addresses the above problems and more in an attempt to reduce the cost of software development and increase the quality of software produced.

Existing debugging information formats suffer from a few well known failings: they must be generated when the program is compiled; they require large amounts of storage to hold the information; and, they do not describe the effects of code optimization well.

Developers learn to live with these problems by a variety of actions. For the last problem, the information providing tools (e.g. the compiler) usually have a switch setting which tells the tool that debugging information is required. When the switch is set, the provider usually generates worse (less optimized) code. Since the other debugger information formats can't describe optimized code, the tools only generate code which can be described. This means that the code the developer debugs may not be the code the developer normally runs. Programs which exhibit errors using optimized code may or may not exhibit errors in the nonoptimized form, and vice-versa. Further, the nature of the errors may be different between the two forms.

For the second problem, where debugging information requires large amounts of storage, developers often deal with this by setting the "debugging switch" (as described in the previous paragraph) for just a few components of the program being debugged. This means that the developer can only effectively debug just those few components. If the developer discovers a need to debug another component, the debugging session must be quit, and the switch set for any additional components, re compile, re debug, etc.

And for the first problem, where the developer must know ahead of time precisely what to debug, developers often take a conservative approach and indicate that they may want to debug everything, leading to the second problem where it can take a large amount of time to create and storage to hold the debugging information.

The debugging system described herein provides a better solution to the problems mentioned above.

SUMMARY OF THE INVENTION

It is therefore an object of the present invention to provide a human oriented, interactive and dynamic process for the debugging of computer programs which promotes better developer focus and concentration, and hence greater productivity.

The disclosed Debugging System solves the above-mentioned problems by generating a rich description of relationships between source code and executable code. The information can be generated on demand; only generating debugging information for the program portion of interest; and, providing a dense encoding of information. Only those pieces of information needed are generated, which results in greatly reduced storage requirements for nearly all debugging scenarios. Further, the information can be stored in an efficient manner. Debugging services are defined by an Application Programming Interface (API), not by static data structures as with conventional debugging information formats. This allows implementors to provide whatever level of data compression is appropriate.

The present system also provides a rich description of the code for the program, resulting in a simple, extensible scheme of describing the effects of code generation which allows for even severely optimized programs to be effectively described. The developer can then debug the program as it exists—not having to "enable debugging" and possibly debug a different version of the program code. Such a rich description is attained by a set of maps which detail aspects of the source code, executable code, variables, data, tokens and other information.

BRIEF DESCRIPTION OF THE DRAWINGS

FIGS. 12 and 13 are block diagrams showing the Token Map, and details of the Token Map entries;

FIGS. 14 and 15 are block diagrams showing the Data Map component of the Database and details the entries of the Data Map in accordance with the principles of the present invention;

FIGS. 16 and 17 are block diagrams showing the Statement Map component of the Database and details of the Statement Map entries which make up the Statement Map;

FIG. 18 shows the base class Source Reference which provides a variety of methods for referencing text in a program;

FIG. 19 is a diagram showing the objects for conveying data locations;

FIG. 21 is a diagram showing a code optimization annotation typically used for conveying annotation information in the Database; and FIG. 22 is a diagram showing Data Optimization Annotation classes.

DETAILED DESCRIPTION OF A PREFERRED EMBODIMENT OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The figures contained herein represent dimensions of both apparatus and method. That is, some of the figures detail both apparatus and methods in a single figure. The apparatus, for example, may be in the form of objects or programs, and methods, for example, may be in the form of functions and information transfer.

It should also be kept in mind that the objects referred to herein have the characteristics of objects in general, unless stated otherwise. In other words, the objects discussed herein have characteristics of extensibility, encapsulation, polymorphism, abstraction, persistency, etc.

It should be kept in mind that the information of the Database described herein is typically in the form of objects which carry with them the full functionality of objects. For example, map entries may be implemented as objects.

Finally, it is to be understood that the apparatus and methods discussed below may be implemented using software or hardware or a combination of both. Therefore, the inventive apparatus and methods could be embodied in a computer readable and usable medium in the form of software which is used by a computer to implement the apparatus and methods discussed herein. Such a computer readable and usable medium is understood to include, but is not limited to, a memory used by a computer system. In general, this includes anything which could be considered usable and readable by a computer.

COMPUTER SYSTEM

The history of object-oriented programming and the development of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object-oriented systems, the reader is referred to "Object-Oriented Design With Applications" by Grady Booch.

Figure 1:
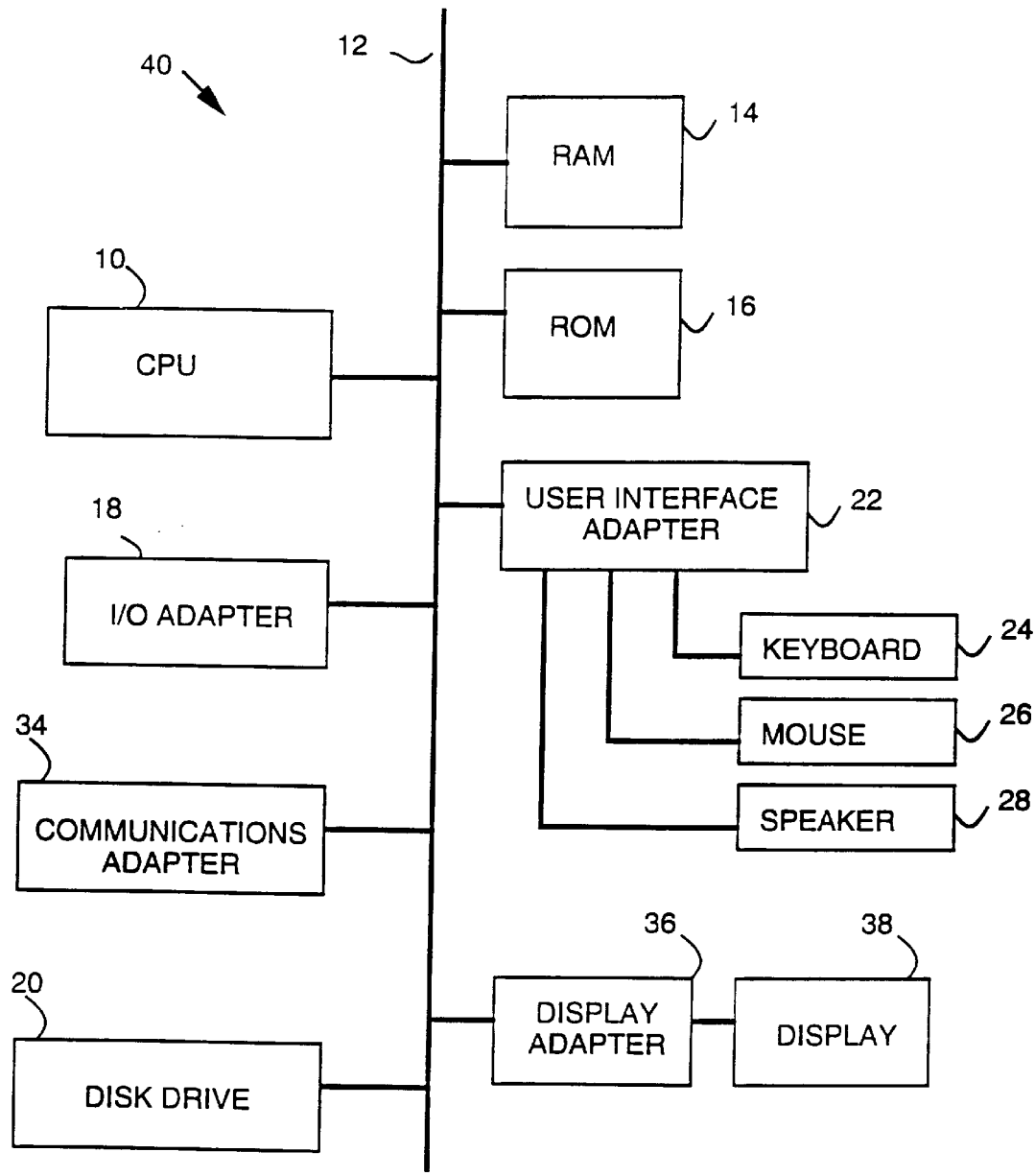
FIG. 1 illustrates a typical hardware configuration of a computer in accordance with the subject invention.

The invention is preferably practiced in the context of an operating system resident on a personal computer such as the IBM®, PS/2®, or Apple® Macintosh® computer. A representative hardware environment is depicted in FIG. 1, which illustrates a suitable hardware configuration of a Workstation 40 in accordance with the present invention. The Workstation 40 has a Central Processing Unit 10, such as a conventional microprocessor, and a number of other units interconnected via a System Bus 12. The illustrated Workstation 40 shown in FIG. 1 includes a Random Access Memory (RAM) 14, a Read Only Memory (ROM) 16, an I/O Adapter 18 for connecting peripheral devices such as disk units to the Bus 12, a User Interface Adapter 22 for connecting a Keyboard 24, a Mouse 26, a Speaker 28, a Disk Drive 20, and/or other user interface devices such as a touch screen device (not shown) to the Bus 12. The Workstation 40 may also have a Communications Adapter 34 for connecting the Workstation 40 to a data processing Network and a Display Adapter 36 connecting the Bus 12 to a Display Device 38. The workstation has resident thereon an operating system such as the Apple System/7® operating system, or other commercially available operating system.

The present invention is an object-oriented Debugging System which requires information beyond what has been conventionally supplied by compilers and other tools. The discussion below outlines the special information needed by the Debugging System and how the symbolic information format provided as part of the debugging process meets those needs. The symbolic information which is generated in the present system has an original grammar which communicates information between various Compiler tools and the Debugger Engine Tool.

The discussion herein does not necessarily correspond exactly to any specific implementation of a debugger, but discusses advantageous compiler to debugger information generation. The general concepts, therefore, are applicable to debugging in general.

The present invention develops a symbolic information Database, and generates information to the debugger which to some extent is dependent upon the information which it is given. Consequently, the broad principles disclosed herein are not directed toward a particular compiler, but are meant to be applicable to a wide variety of compilers, or even other information producers.

MOTIVATION

As development environments have become increasingly more complex, there has been a corresponding need for more powerful debugging tools. Many times, however, the more powerful debugging tools need information which may not be generated directly from a compiler. The development environment debugger disclosed herein ("the debugger") is a tool which provides such a new class of debugging services. The present invention generates information to be used by the debugger in a Debugging System. The information may be in the form of data bases.

INFORMATION WRITER AND READERS

Figure 2:
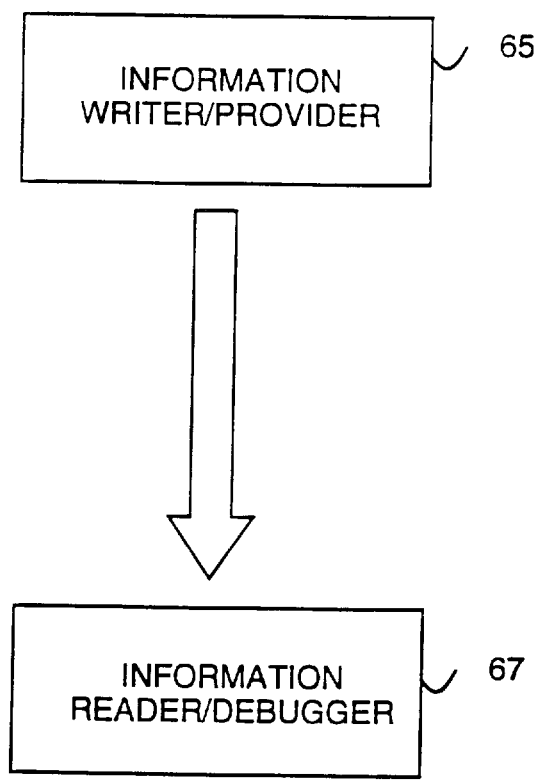
FIG. 2 is a block diagram showing a general system consisting of information writers, or producers, and information readers, such as debuggers.
Figure 3:
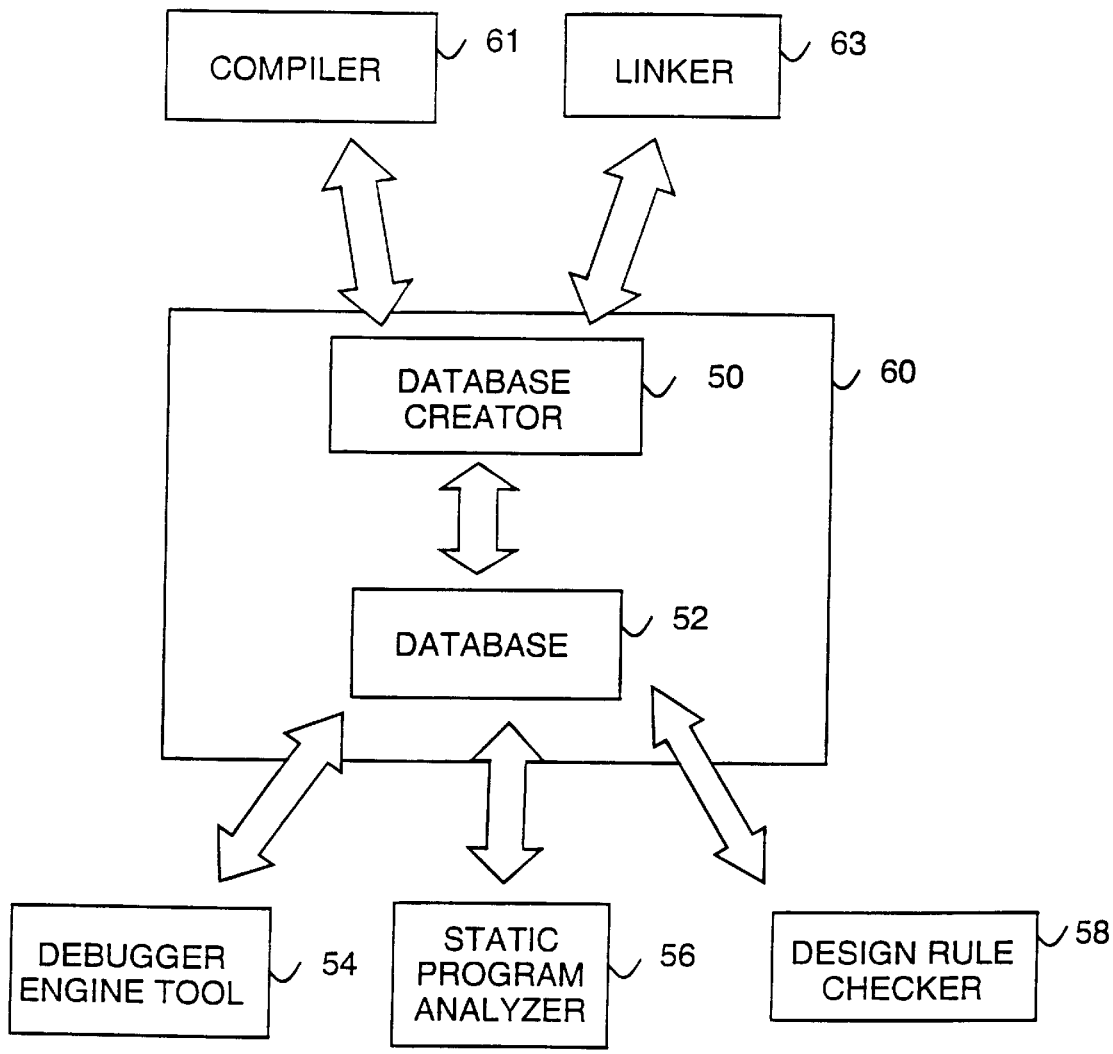
FIG. 3 is a block diagram which shows an interface between a set of information writers, or "providers," such as a compiler and a linker, and a set of information consumers, such as a Debugger Engine Tool, a Static Program Analyzer, a Design Rule Checker, etc.

Debugging information is really a database of information about a compiled program. As shown in FIG. 2, a general system consists of Information Writers 65, or Producers, and Information Readers, or Consumers, 67, such as debuggers. As shown in FIG. 3, there is typically a small set of Information Writers, sometimes known as "providers," such as a Compiler 61 and a Linker 63, and a larger set of Information Consumers, such as a Debugger Engine tool 54, a Static Program Analyzer 56, a Design Rule Checker 58, etc. It is not often that the information provided by the providers exactly matches the information needed by the consumers. The information generator described herein provides an information format which presupposes that the information from the provider does not have the content or format needed by the consumers.

The present system provides an interface between Information Providers and Information Consumers. As shown in FIG. 3, the Interface 60 includes a Database Creator 50 and a Database 52. The Database 52, as discussed in detail below, contains information received from the Information Providers, such as 61 and 63, and is standardized so as to be understood by the Information Consumers, such as 54, 56 and 58. The Database 52 also contains information which is defined by the Information Providers for use by the Information Consumers.

The present disclosure is primarily directed toward the System 60 used in the context of a Debugging System. It should be kept in mind, however, that the System 60 could be used between any information provider and consumer. The particular providers and consumers shown in FIG. 3 are for illustrative purposes only.

THE DEBUGGING SYSTEM

The disclosed Debugging System solves the prior art problems mentioned above by providing a dense encoding of information regarding relationships between source information and compiled information. The present invention provides an extremely rich description of the code resulting from compilation of a source program.

Figure 4:
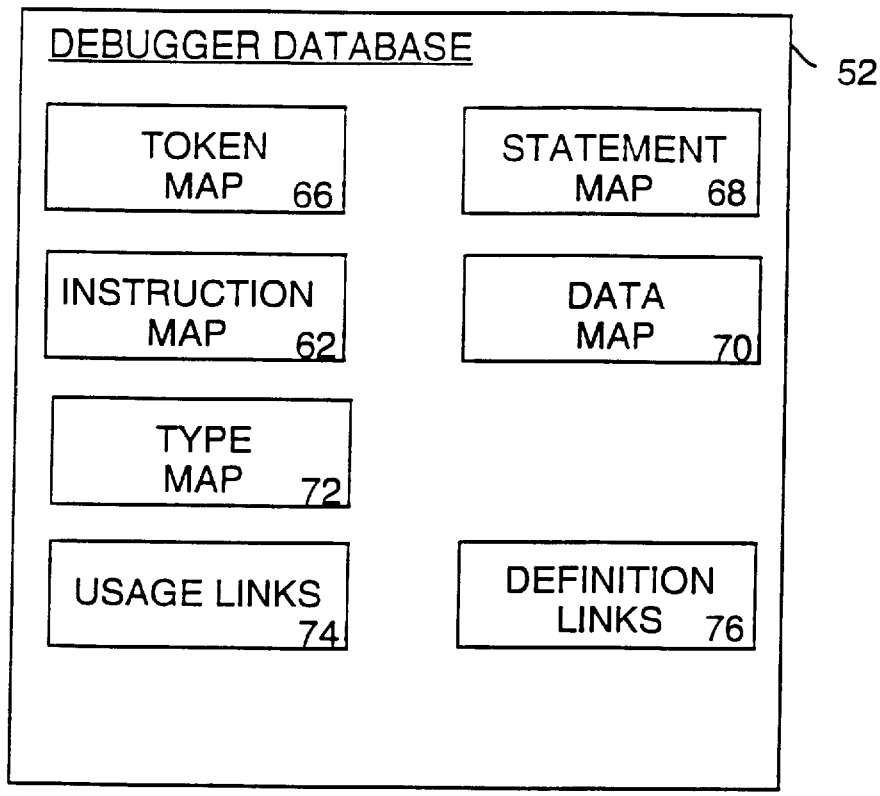
FIG. 4 is a block diagram showing the Database components developed in accordance with the present invention.

FIG. 4 is a block diagram showing the major components developed to create the Debugger Database 52 of the present invention. The Debugger Database 52 includes a Token Map 66, a Statement Map 68, an Instruction Map 62, a Data Map 70, a Type Map 72, Usage Links 74, and Definition Links 76. These components of Debugger Database 52 will be discussed in greater detail below.

A simple, extensible scheme of describing the effects of code generation allows for even severely optimized programs to be effectively described. A developer can then debug the program as it exists—the developer does not have to "enable debugging" and possibly debug a different version of the program code. It is important to keep in mind that the discussion herein is describing the information provider's interface to the symbolic information component of the Debugger. The Debugger reformats any provided information into a form more suitable and possibly more compact, but this is all hidden from the provider.

Figure 5:
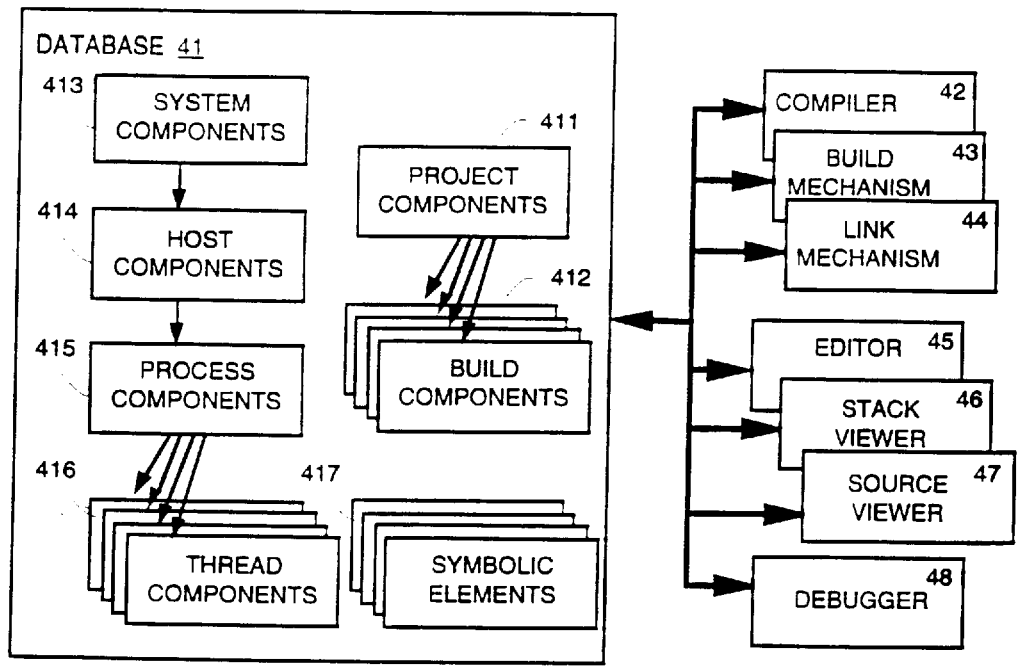
FIG. 5 is a block diagram showing the major functionalities of the invention.

FIG. 5 is a block diagram showing the eight major functionalities of the invention. These are the Database 41; the Compiler 42; the Build Mechanism 43; the Link Mechanism 44; the Editor 45, a Graphical Viewer; a Stack Viewer 46; a Source Viewer 47 (also called the Dynamic Source Viewer); and the Debugger 48.

The Database 41 should be considered to be supplemental to the Debugger Database 52, discussed above with respect to FIG. 4. Database 41 of FIG. 5 is demonstrates another view of the information used in accordance with the principles of the present invention. Database 41 is composed of a set of buildable components, here shown as a Project Component 411 and a collection of Buildable Components 412 which model a program which is to be built. The Database 41 also contains non-buildable components contained within the System Component 413.

The Debugger 48 creates and modifies Host Components 414 which correspond to target machines; the Process Components 415 and Thread Components 416 model the dynamic state of the executing programs that are being debugged. Compiler 42 calculates the dependencies associated with the components in the Database 41. The Build Mechanism 43 uses properties of components along with compiler-generated dependencies to build the program. The Link Mechanism 44 connects properties of the built programs to create an executable binary.

A programmer changes the program by means of an Editor 45. Editor 45 must be capable of creating and deleting components, and typically of cutting, copying, pasting and moving components. The Editor 45 must also be capable of changing the data in the interface and implementation properties. This is usually performed by allowing direct modification of text, although other more structured approaches such as selection from menus are possible. In practice, Editor 45 will often consist of a number of editors, possibly as many as one for each type of interface or implementation property or possibly even for subfields of data in those properties.

The Stack Viewer 46 displays the stack property of a single thread component that represents a thread being debugged in a target program. Stack Viewer 46 displays one part of the dynamic state of the program—the program call stack—which displays the functions that are currently being called as subroutines. The user can select by direct manipulation using an input mouse, causing the Viewer output to be a reference to the thread component, stack property, and stack frame selection, an ordinal of the stack frame, counting from the currently executing function.

The Dynamic Source Viewer 47 is similar to Editor 45 in that it displays the interface or implementation Property and the program text. Instead of taking a program component as input, it instead takes a thread component. The input can be more specific, such as is set as output by the Stack Viewer 46, in which the input reference may also indicate the Stack Property and a stack frame selection. In this case, the Dynamic Source Viewer 47 will compute the program's location based on the stack frame property, and then the program source component corresponding to the function associated with that stack frame.

Once the programmer requests that a program should be executed under control of the Debugger 48, components are created, under direction of the Debugger 48, in the same Database 41 which represent the processes and threads. Properties in these components contain data that change during the execution of the program. This data includes memory, registers, and state, which also allow the Debugger 48 to control the debugged program. The Debugger 48 uses the symbolic properties of the Components 412. These symbolic properties change themselves on demand to generate the symbolic data that is stored within.

Database 41 also includes a collection of Symbolic Elements 417 which model a program which is to be built, and maintain a description of the program once it has been built. The Compiler 42 calculates the dependencies associated with the components in the Database 41 and communicates with the Link Mechanism 44 to produce a description of the program which is stored in the Symbolic Elements 417. The Build Mechanism 43 uses properties of components along with compiler-generated dependencies to build the program.

Figure 6:
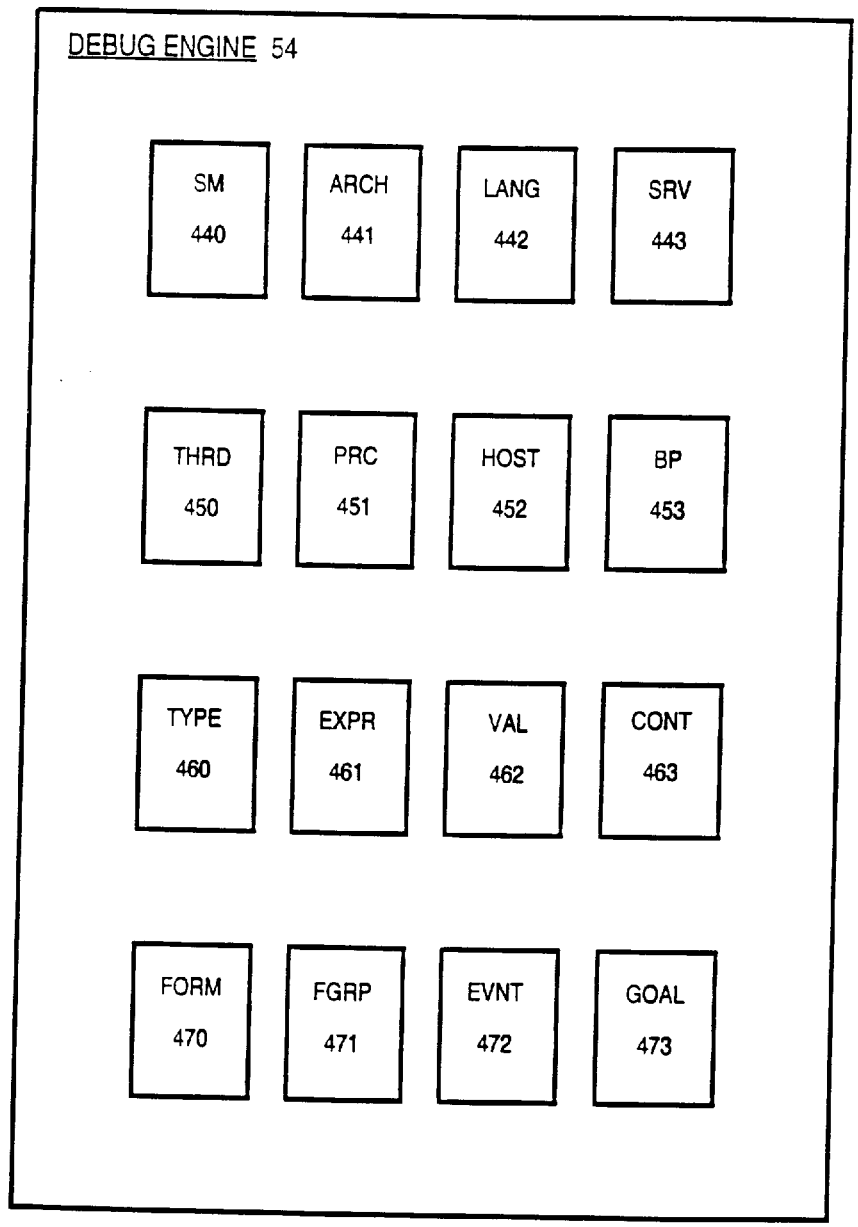
FIG. 6 is a block diagram showing the debug engine objects in accordance with a preferred embodiment of the invention.

The Debugger 48 consists of a collection of services provided by objects. A detailed block diagram of the objects is provided in FIG. 6. The names of the services in the drawings have been shortened for convenience. The State Machine Object 440 models the state of elements of the program being debugged. The Architecture Object 441 models the CPU instruction set and Operating System details of the program that is currently being debugged. The Language Object 442 models the computer languages utilized in the program currently being debugged. The Server Object 443 models a uniform set of primitive services utilized by the Debugger Engine (e.g., breakpoints, stepping, read/write, memory dump . . . ).

The Thread Object 450 models a thread within the program currently being debugged. The Program Object 451 models a program currently being debugged. The Host Object 452 models the communication link between the Debugger Engine 54 and a target server which provides basic services via a communication link to the Server Object 443. The BreakPoints Object 453 provides a set of services related to logical and physical breakpoints. There can be multiple logical breakpoints corresponding to a single physical breakpoint in a Debugger System in accordance with a preferred embodiment.

The Type Object 460 models a language type, for example, integers, characters, real, arrays, records and functions. The Expression Object 461 models references to program variables or operations on the program variables. The Value Object 462 models the value of expression objects, for example, the value of a variable I, or the expression "12th element of array A". The Context Object 463 models the instantaneous execution state of a Process Object 451 or Thread Object 450 that is currently being debugged.

The Formatter Object 470 provides services to convert a Value Object 462 into an image which can be displayed on a display or other output device. The Formatter Group Object 471 selects a Formatter Object 470 based on the Type Object 460 associated with a Value Object 462. The Event Object 472 models the events utilized in goal directed problem solving. The Goal Object 473 models the goals utilized in goal directed problem solving. For example, execute a statement, run a program to the completion of function A, identify memory leaks or detect changes in a variable's value.

The direct clients of symbolic debug information in accordance with a preferred embodiment of the invention are the Type Object 460, the Expression Object 461, the Value Object 462, the Context Object 463, the Formatter Group Object 471 and the Goal Object 473.

Sample Program To Illustrate A Preferred Embodiment.

```
int Foo(char a)
{
    bool yes = a== 'Y';
    if (yes) {
        printf ("%c = OK ", a);
        return yes;
    }
    else {
        printf ("%c = NO ", a);
        return yes;
    }
}
```

A sample program which returns a "1" if the parameter is equal to a "Y" and a "0" otherwise. This program is utilized to elaborate on how maps are used in a preferred embodiment.

A user may set a breakpoint on the first "printf" statement, but not the second to determine flow of control through the program as it executes. Maps are used to manage the breakpoint execution as the code is optimized by the compiler.

INSTRUCTION MAP

Figure 7:
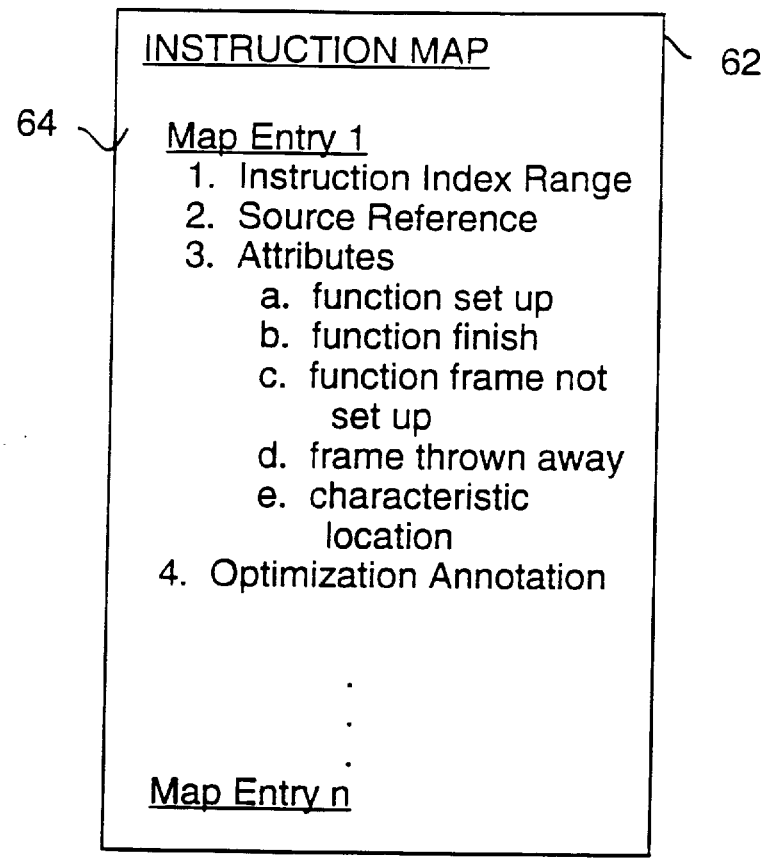
FIGS. 7–10 are block diagrams detailing the contents of the Instruction Map generated by the disclosed system, and the Instruction Map entries which make up the Instruction Map.

FIG. 7 is a block diagram providing an overview of the Instruction Map 62 generated by the disclosed system, and the Instruction Map entries 64 which make up the Instruction Map 62. The Instruction Map 62 provides detailed knowledge of how each executable machine instruction relates to the original source code which caused the instruction to be created.

The following describes, from the provider's perspective, a PCSourceMapElement entry 64 in the map 62.

```
struct   PCSourceMapElement
{
    TPCLocation          fPcLocation;
    TSourceReference*    fSourceReference;
    TOptimizations*      fOptimization;
    PCAttributes         fPCAttributes;
    PCSourceMapElement();
    ~PCSourceMapElement();
};
```

FIG. 7 shows each element of the map. Each map entry 64 in the map 62, consists of the following:

1. An instruction index range, of type TPCLocation: This indicates the set of instructions being described by the entry. The instruction index range typically consists of two numbers: a start and a length. The start indicates the first instruction covered by the map entry. The length indicates how many instructions, beginning with the starting instruction, are covered by the map entry. It is not necessary that a start and length be used. For instance, a set could be used, where each member of the set corresponds to an instruction in the program. It is also contemplated that the compressed forms of the start/length information could be used. For instance, the start could be implied to be the first instruction following the previous map entry, and only the length would be encoded. The particular start/length form could be chosen in order to complement the particular characteristics of the information provider (e.g. the compiler).

2. A source reference, of type TSourceReference: This describes a selection of text which, according to the provider, was responsible for the generation of the instructions covered by this entry. Source references are described in further detail below, but a wide variety of methods of referencing source are provided. For instance, the developer can reference a contiguous set of characters from some text, or have a set of character ranges, or use a token reference (see below—"The Token Map"), and so forth.

3. A set of attributes, of type PCAttributes: The current set of attributes defined includes: In_Prologue, In_Epilogue, Frame_Not_Constructed, Frame_Destructed, and Characteristic_Location.

Instructions marked with In_Prologue are involved in setting up a function for execution, such as saving registers, establishing a frame, or making copies of actual parameters. They usually map to some predefined source position, such as the opening brace in a C or C++ function.

Instructions marked with In_Epilogue are involved in finishing up a function's execution, such as restoring registers, destroying a frame, or copying a result to the caller. They usually map to some predefined source position, such as the closing brace in a C or C++ function.

Instructions marked with Frame_Not_Constructed are usually part of the prologue sequence. The marking indicates that any frame for the function has not been set up yet. The instruction(s) that actually set up the frame also will be marked with this attribute. Keep in mind that instruction attributes describe the state of things if one were to stop on that particular instruction, before that instruction was executed. So, Frame_Not_Constructed would be reset (i.e., not set) beginning with the instruction after the frame is constructed.

Instructions marked with Frame_Destructed are usually part of the epilogue sequence. The marking indicates that any frame for the function has been thrown away. The instruction(s) that actually throw away the frame (e.g. restore a frame pointer to the caller's value) will not be marked with this attribute, but the instructions after would.

The Characteristic_Location attribute is used to note that the instruction corresponds to an interesting breakpoint location for some statement. It is one way of making such an association. The preferred way of noting breakpoint locations for a statement is to make the annotation directly in the Statement Map 68.

4. A list of Optimization Annotations, derived from type TOptimization: The section below, entitled "Code Optimization Annotations" describes the specific annotation entries that can appear in this list.

If an instruction maps to several different source references, then a separate PCSourceMapElement entry could be created for each mapping, but use of Optimization Annotations for this case would probably be more desirable. It is important to keep in mind that the discussion herein is describing the information provider's interface to the symbolic information component of the Debugger. The Debugger reformats any provided information into a form more suitable and possibly more compact, but this is all hidden from the provider.

Figure 8:
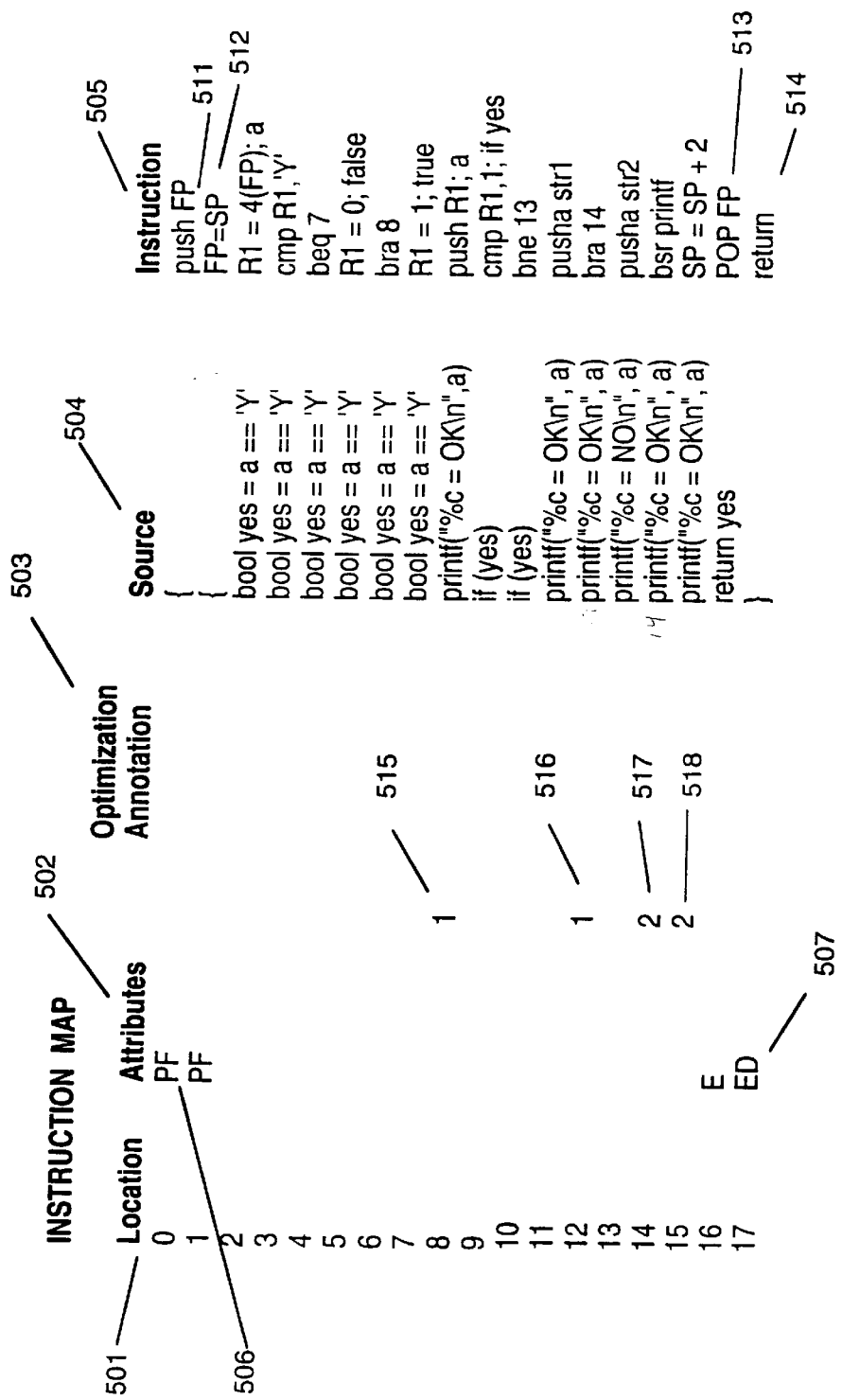

In a sample Instruction Map associated with the sample program, as shown in FIG. 8, common subexpression elimination and common tail merge optimization by the compiler make it difficult to set a breakpoint on one of the "printf" statements, but not the other "printf" statement.

FIG. 8 is an Instruction Map in accordance with a preferred embodiment of the invention. The location 501 is a number representative of the op code of the machine instruction corresponding to an instruction in the sample program set forth above. The attributes 502 defined in a preferred embodiment includes: In_Prologue, In_Epilogue, Frame_Not_Constructed and Frame_Destructed. Instructions marked with In_Prologue are involved in setting up a function for execution, such as saving registers, establishing a frame, or making copies of actual parameters. The instructions map to some predefined source position, such as the opening brace in a C or C++ function. Instructions marked with In_Epilogue are involved in finishing up a function's execution, such as restoring registers, destroying a frame, or copying a result to the caller. The instructions map to some predefined source position, such as the closing brace in a C or C++ function.

Instructions marked with Frame_Not_Constructed are usually part of the prologue sequence. The marking indicates that any frame for the function has not been set up yet. The instruction(s) that actually set up the frame also will be marked with this attribute. Instruction attributes describe the state of things if stopped on that particular instruction, before that instruction was executed. So, Frame_Not_Constructed would be unset (i.e., not set) beginning with the instruction after the frame is constructed.

Instructions marked with Frame_Destructed are usually part of the epilogue sequence. The marking indicates that any frame for the function has been thrown away. The instruction(s) that actually throw away the frame (e.g., restore a frame pointer to the caller's value) will not be marked with this attribute, but the instructions after would. In FIG. 8, PF 506 the P is shorthand for the In_Prologue attribute as discussed above and the F is shorthand for a Frame_Not_Constructed attribute. In ED 507, the E is shorthand for In_Epilogue attribute and the D is shorthand for the Frame_Destructed attribute.

An Optimization Annotation 503 describes if the instruction is affected by optimization performed by the compiler. Source 504 corresponds to the source code related to the instruction according to the compiler. The instruction area 505 is not part of the actual map in accordance with a preferred embodiment, but is included as an aid for clarifying the invention to assist in understanding the preferred embodiment. The instructions 505 are for a hypothetical machine and loosely correspond to the sample program set forth above.

The remaining elements of FIG. 8 will be discussed below in the discussion of FIGS. 9 and 10.

Figure 9:
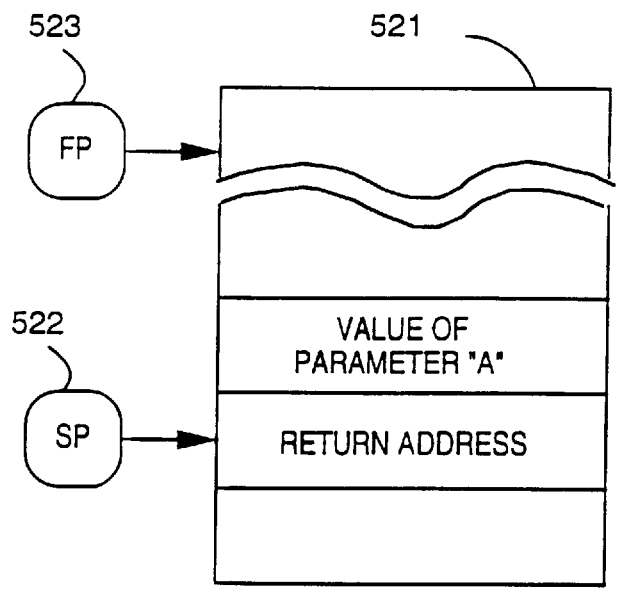

FIG. 9 illustrates a frame in accordance with a preferred embodiment at the time the sample program is invoked. A frame, such as Frame 521, is a range of memory locations in a computer containing parameters passed to a function, return addresses, saved register values, values for program variables and locations to store expression values as they are computed. A frame is typically accessed via one or two logical registers: a StackPointer 522 pointing to the beginning of the frame's stack in memory and a FramePointer 523 pointing to the beginning of the frame in memory. In FIG. 10 (corresponding to label 511 of FIG. 8), the old FramePointer 523 value is pushed onto the stack, and at label 512, the FramePointer 523 is set equal to the StackPointer 522 to create a new frame.

Figure 10:
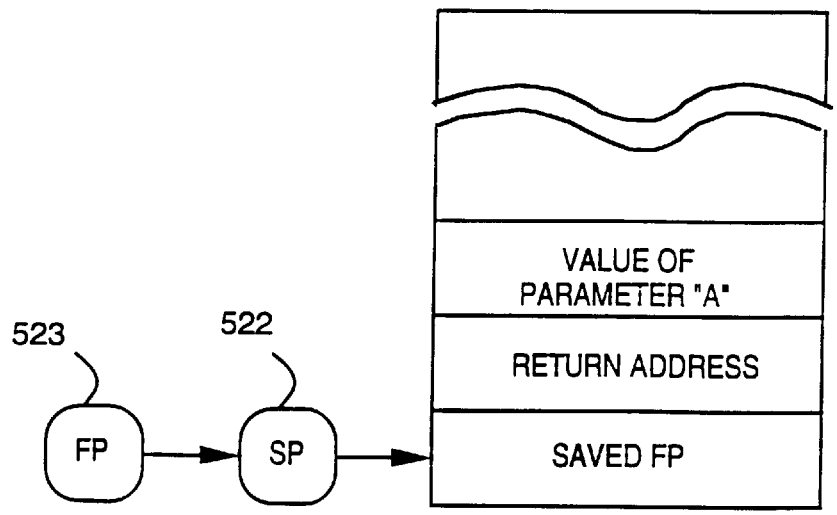

FIG. 10 corresponds to the creation of a frame after execution of instruction 512 in FIG. 8. As shown in FIG. 10, Frame Pointer 523 points to Stackpointer 522, which points to a saved Framepointer. As discussed above, instructions 511 and 512 (FIG. 8) are prologue code that initialize the environment for the sample program's execution. This corresponds to the "P" attributes shown at 506 as discussed above. Until the instruction at 512 has been executed, the frame for the sample program has not been initialized, which is captured in the map with the "F" attributes 506.

When a function is about to end, it must restore the caller's frame and return any resulting value. These functions are typically performed in the epilogue, which correspond to the instructions at 513 and 514 of FIG. 8, which both have the "E" attribute 507. Also, the instruction at label 513 restores the caller's frame value. So at label 514, the sample program's frame has been destroyed as indicated by the "D" attribute 507. The compiler indicates the sample program's source which best motivates the generation of the instructions 505. The Source 504 could correspond to a character range in the actual program listing or could refer to a set of tokens in a Token Map. One skilled in the art could envision many other ways to map instructions to source without departing from the claimed invention.

The Code Optimization Annotation 503 contains zero or more Code Optimization Annotations for each instruction. The Code Optimization Annotation 515 indicates that the common operation corresponding to passing a variable "a" to a "printf" routine in the sample program is performed only once even though there are two statements in the sample program that execute this code. Code Optimization Annotation 516 indicates that many of the instructions necessary for invoking the first "printf" routine corresponds to the second "printf" invocation. Likewise Code Optimization 517 and 518 indicates that much of the code in the second "printf" invocation corresponds to the first.

ADOPTPCSOURCEMAP

Figure 11:
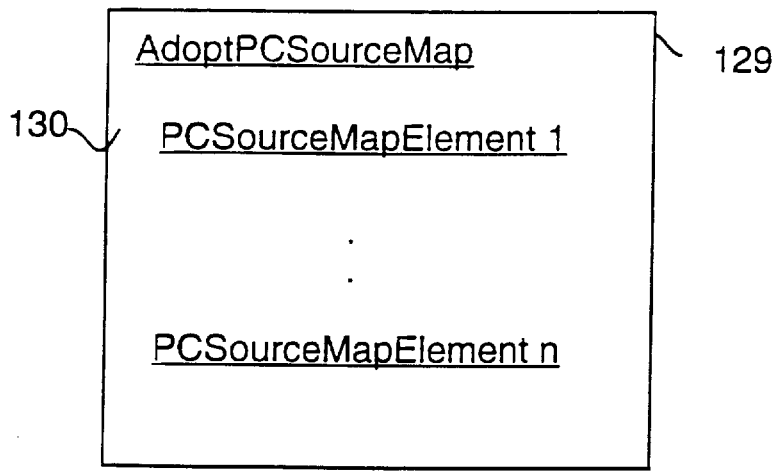
FIG. 11 is a block diagram of the function AdoptPC-SourceMap for asking the information reader to adopt a particular format of information from a provider.

FIG. 11 is a block diagram of the function AdoptPCSourceMap 129 for asking the information reader to adopt a particular format of information from a provider. The provider must put together a list of PCSourceMapElement entries 130 and ask the Debugger to adopt the information which describes a component in the Debugger Database. The following shows the Adopt function interface:

--- void AdoptPCSourceMap (const THoopsPropertyName name,
TPCSourceMapList*
pcSourceMap);

---

There is a different map kept to describe the Interface v. the Implementation properties of a component, so the developer must supply a "name" parameter to indicate which property the map describes.

THE TOKEN MAP

Figure 12:
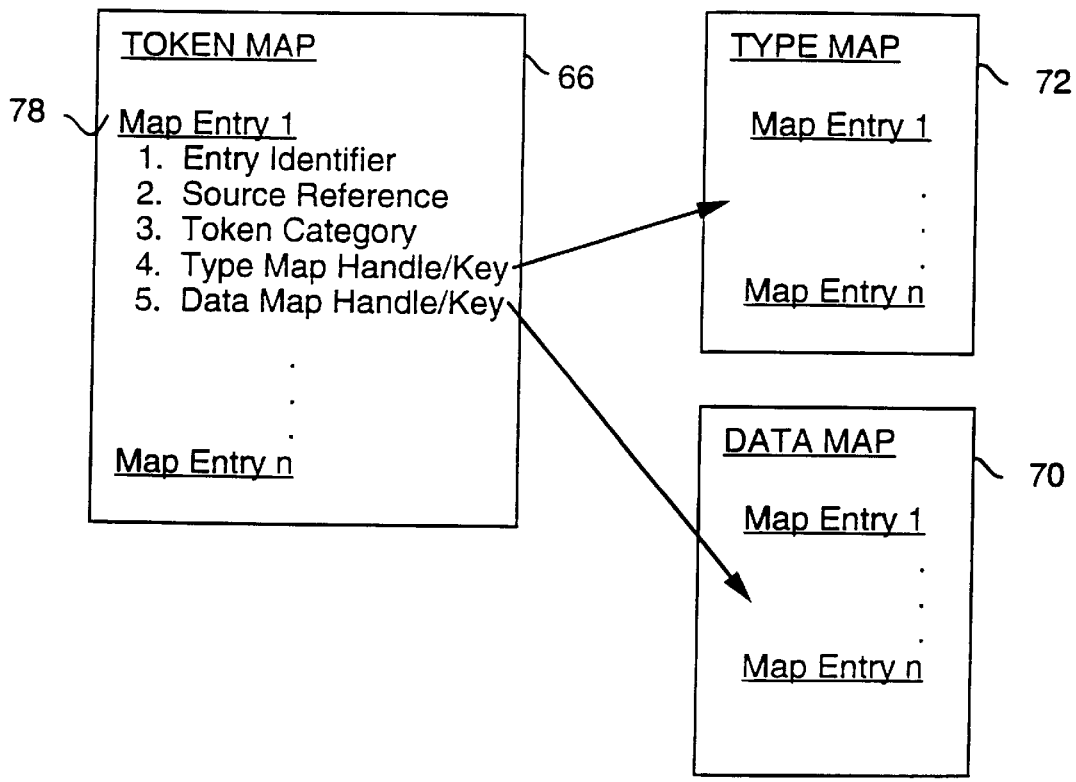

FIG. 12 is a block diagram showing a general overview of Token Map 66, and details of the Token Map entry objects 78. The Token Map 66 provides an indication of contiguous strings of characters in the source program. The entries 78 correspond to "tokens" in the source program's language, like identifier names, integer values, strings, keywords, arithmetic operators, etc. The following describes, from the provider's perspective, an entry in the Token Map 66:

```
TLanguageToken (const Language TokenID      id,
                const TSourceElement&        sourceElement,
                const ComponentIdentifier    component,
                    ELanguageTokenKind kind=
                            kNoTokenKind,
                    LanguageTypeID typeHandle=
                            kNoSemanticType,
                const LanguageTokenID        dataMapHandle=
                            KNoDataMapEntry);
```

Each entry 78 in the Token Map 66, consists of the following, shown descriptively in FIG. 12:

1. An identifier, of type LanguageTokenID: This is a positive number, a key, which uniquely defines an entry in the Token Map 66.

2. A source reference, of type TSourceElement: This describes a selection of text which, according to the provider, corresponds to a single interesting token. A TSourceElement provides a character range, an indication of the text for which the range applies. There are also TSourceElement objects available for implicit text which may not actually appear in the source, such as the C++ implicit variable "this".

3. A kind, of type ELanguageTokenKind. A provider-specific enumeration which categorizes the token. It might break out tokens into, say, identifiers, literals, keywords, operators, etc.

4. A Type Map handle, of type LanguageTypeID: For tokens which correspond to objects which can take on a value, or which represent a type name in the source language, this is a handle or key to an entry in the Type Map 72 (see the section regarding "The Type Map") describing that type of the token.

5. A Data Map handle, of type LanguageTokenID: For tokens which correspond to objects which can take on a value, this is a handle, or key, to an entry in the Data Map 70 describing how to read and write that value.

Ideally, all characters which are not spaces, tabs, linefeeds or similar positioning characters should be covered by a Token Map entry. Tools like a pretty printer could conceivably then operate on the displayed text of a component by simply adjusting the source position of elements in the Token Map 66 without affecting any other clients of the symbolic data for a component. Other tools and maps should then reference elements of the source component by entries in the Token Map 66.

The provider must put together a list of TLanguageToken entries and ask the Debugger to adopt the information which describes a component in the cpProfessional Database. The following shows the adopt function interface:

```
void AdoptTokenMap (const THoopsPropertyName    name
                    TLanguageTokenSetList*
    tokenMap);
```

There is a different map kept to describe the interface v. the implementation properties of a component, so the developer must supply a "name" parameter to indicate which property the map describes.

FIG. 13 is an example Token Map in accordance with a preferred embodiment. The Key 610 is a unique number corresponding to each entry in the Token Map. The Source 620 references characters described by the Token Map entry uniquely identified by the Key 610. The Kind 630 is a language specific enumeration for each possible token in the computer language. The Type Map Key 640 value corresponds to a Key in the Type Map if there is an entry in the Type Map. Each entry in a Type Map describes everything necessary to interpret a value for the program. The number of bits of storage required to store a value whether a scalar, array or other language type. If a scalar, whether signed or unsigned. A Data Map Key 650 corresponds to the unique identifier Key in the Data Map which is illustrated in FIG. 15 at 651.

THE TYPE MAP

The Type Map 72 will not be discussed in detail. Entries in the Token Map 66 contain a handle, or key, which correspond to an entry in the corresponding Type Map 72. The provider must create a Type Map entry to satisfy each handle referenced in the Token Map 66 except for references to standard, or "built-in" types, such as various kinds of integer or floating point types. These built-in types are referenced by special, reserved Type Map handles.

Each entry in the Type Map 72 describes, in a language-neutral way, a value type. There are subclasses which describe integer, floating point, pointer, reference, array, subprogram, etc. types. Each entry describes the bit size of an object of the type. Scalar type entries describe if and how the value sign is formed, the minimum and maximum values for the type, and so forth. Enumeration types include a list mapping each valid value to a value name. Array types indicate whether the index bounds are static or dynamic, and how to get the bounds. This is just a slice of the kind of information contained for each entry in the Type Map 72.

DATA MAP

Figure 14:
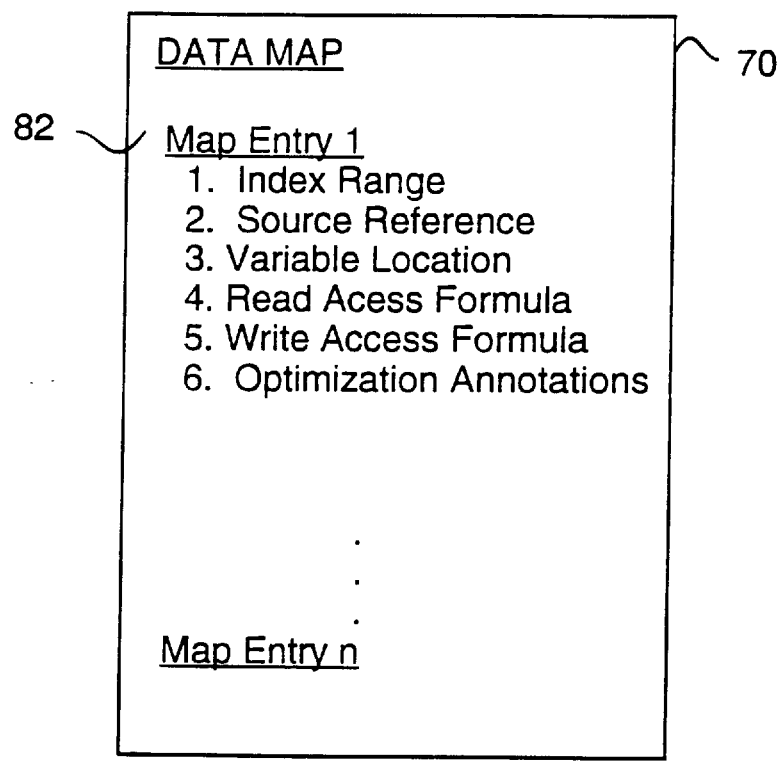

FIG. 14 is a block diagram showing a general overview of the Data Map 70 component of the Debugger Database in accordance with the principles of the present invention. Anything that can take on a value in a program might be described by an entry in the Data Map 70. Entries might correspond to variables and constants in a program, parameters of a function, or implicit value-taking objects, such as the implicit "this" variable in C++ objects. The following describes, from the provider's perspective, an entry in the Data Map 70:

```
struct PCDataMapElement
{
    TPCLocation          FPcLocation;
    TSourceReference*    fSourceReference;
    TDataLocation*       fDataLocation;
    TAccessFormula*      fReadFormula;
    TAccessFormula*      fWriteFormula
    TOptimizationList*   fOptimization;
    PCDataMapElement();
    ~PCDataMapElement();
};
```

Each entry 82 in the Data Map 70, consists of the following:

1. An instruction index range, of type TPCLocation: This indicates the set of instructions being described by this entry. The indicated variable is live whenever the program is about to execute any of the instructions in this range. The value typically consists of two numbers: a start and a length. The start indicates the first instruction covered by the map entry. The length indicates how many instructions, beginning with the starting instruction, are covered by the map entry. See the above discussion regarding "The Instruction Map" for possible encodings of this field.

2. A source reference, of type TSourceReference: This describes a selection of text corresponding to the data object described by this entry. Source references are further described below under "Source references." The preferred source reference method is to name an entry in the Token Map 66 corresponding to the data object described.

3. A description of the live location of the variable, of type TDataLocation: A data location provides a formula which is to be interpreted in the context of the executing program when it has paused at any instruction in the instruction range covered by this map entry. It can refer to absolute addresses, or registers in some frame context. It can have additional operators and operands to add offsets to an address, get the contents of memory pointed-at by an address, get a range of bits from a value, etc. Data locations are further described below in "Data locations."

4. A description of how to read the value, of type TAccessFormula: In most cases, a value is simply contained in the bits described by the data location just described. With some types of optimization, however, the value might be part of an expression which can be decomposed to extract the desired value. For instance, a loop control variable might be embedded in an induction variable, a variable which points at some array element indexed by the loop control variable.

The induction variable then contains the address of the "i-th" array element, where "i" is the loop control variable. The read access formula could then indicate that to get the value of "i" from the induction variable, one must first subtract the base address of the array, and then divide by the array element size. Access formulas are further described below in "Access formulas."

5. A description of how to write the value, of type TAccessFormula: Like the read access formula just described, but this describes how to create the needed expression value to store when it is desired to update the value of the data object corresponding to this map entry. For the induction variable example above, the formula would indicate that the new value for the data object would be multiplied by the size of an array element, and added in the base address of the array. The result is the real value that must be written to the data location. See "Access formulas" for further description of access formulas.

6. A list of Optimization Annotations, of type TOptimization: The section below entitled "Data Optimization Annotations" describes the specific annotation entries that can appear in this list.

The provider must put together a list of PCDataMapElement entries and ask the Debugger to adopt the information which describes a component in the Debugger Database. The following shows the adopt function interface:

```
void AdoptPCDataMap (const THoopsPropertyName    name,
                     TPCDataMapList*
                     pcDataMap);
```

There is a different map kept to describe the interface v. the implementation properties of a component, so the developer must supply a "name" parameter to indicate which property the map describes.

FIG. 15 is an example of a Data Map in accordance with a preferred embodiment. The Key in the Data Map 651 is a unique number corresponding to each entry in the Data map. The Variable 652 corresponds to a variable in the source program and although not required, it typically references an entry in the Token Map. The PC Location 653 indicates a range of instructions in the Instruction Map (FIG. 8) at label 501 for which the Variable 652 is live. Live refers to a variable that has storage allocated for its use. Location 657 is an address or register corresponding to the storage allocated for a variable's use.

Read Formula 654 defines how a variable is read from location 657. Write Formula 655 defines how a variable is written to a location 657. Optimization Annotation 656 corresponds to a data Optimization Annotation describing any optimizations performed by the compiler. In the sample program, the functions return value is always equal to the variable "yes", so Data Optimization 658 indicates that the function's return value has a shared lifetime with variable "yes". By shared lifetime, changing the value of one variable necessarily entails a mirrored change to the other variable. Similarly, data optimization 659 indicates that the "yes" variable has a shared lifetime with return value for function "Foo".

STATEMENT MAP

Figure 16:
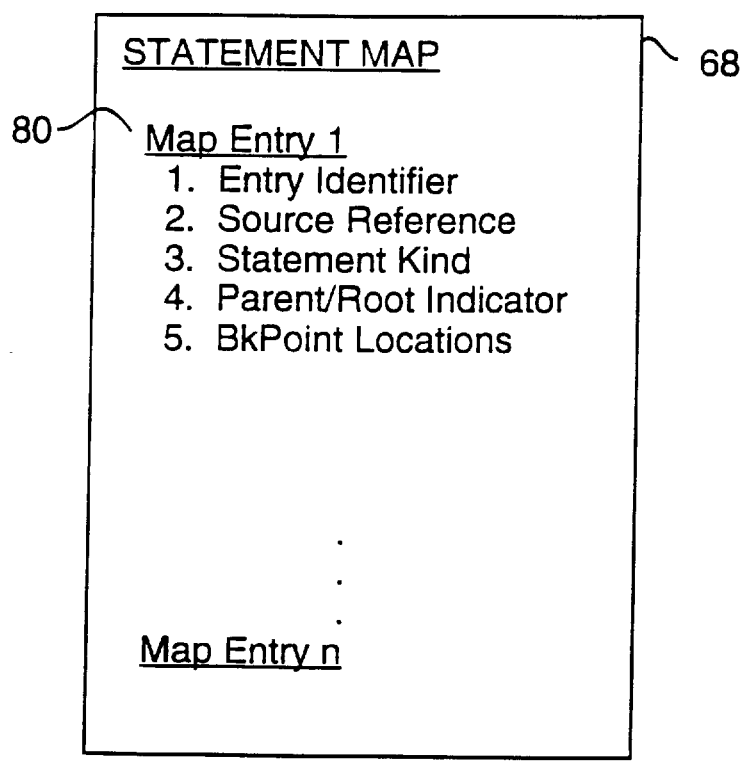

FIG. 16 is a block diagram showing a general overview of the Statement Map 68 and details of the Statement Map entries which make up the Statement Map 68. The term "statement" should in this context should be explained to avoid misinterpretation. Each entry in this map corresponds to something that the provider considers to be an interesting statement-like entity. It might not only be the usual notion of a statement in the source language, such as a switch statement, an assignment statement, or even a complete function, but it might correspond to interesting elements, like an expression, a label, etc. Statements are related to each other such that they form a tree description of the source program. The root node of the tree corresponds to a complete compilation unit. Each child of the root represents statements Immediately contained in that root. Each of those children can also have children corresponding to, say, statements contained within a block statement. The following describes, from a provider's perspective, an entry 80 in the Statement Map 68:

```
TLanguageStatement
    (const LanguageStatementID id,
     const TSourceReference& source,
         ELanguageStatementKind
             kind= kNoStatementKind,
                 LanguageStatementID
                 parentStatement=
                     kNoStatementID,
                 TBreakpointList*
                 breakpointList=NULL);
```

Each entry 80 in the Statement Map 68 is comprised of the following objects (shown descriptively by number in FIG. 16):

1. An identifier, of type LanguageStatementID: This is a positive number, or key, which uniquely identifies an entry in the Statement Map 68.

2. A source reference, of type TSourceReference: This describes a selection of text which, according to the provider, corresponded to a single interesting "statement". See "Source references" for a description of all the ways the provider can provide a source reference.

3. A kind, of type ELanguageStatementKind: A provider-specific enumeration which breaks out the various kinds of "statements." For example, one language might provide an enumeration which categorizes assignment statements, break statements, goto labels, switch labels, functions names, etc.

4. A parent statement, of type LanguageStatementID: This is a positive number which references another statement which represents the parent in a tree-form view of statements, or is kNoStatementID which indicates that this Statement Map entry is the root of the statement tree.

5. A list of breakpoint locations for the statement, of type TBreakpointList*: Because of certain code optimizations, such as loop unrolling, a single statement may have more than one breakpoint location associated with it.

FIG. 17 is an example of a Statement Map in accordance with a preferred embodiment. The Key 670 in the Statement Map is a unique number corresponding to each entry in the Statement Map. The Source 674 corresponds to the text of the Statement in the source program. The Kind 671 is a language sensitive enumeration describing the statement. The Parent 672 refers to an entry in Key 670 or has a value zero assigned to it. The Parent relationship describes the statements in a program in a tree relationship. So, for example, a Statement Map entry whose parent value is zero is the root of the tree. The Breakpoint 673 refers to a Location value 501 in the Instruction Map set forth in FIG. 8 and corresponds to the compiler's advice on the best instruction where a breakpoint should be installed for this statement. A list of breakpoint locations is permissible, depending on optimizations performed by the Compiler.

SOURCE REFERENCES

FIG. 18 shows the base class Source Reference 84 which provides a variety of methods for referencing text in a program. As shown in FIG. 18, it's possible to describe source text as:

1. A range of characters in some property of a program component: The source reference consists of a reference to a program component, a property within that component, and some indication of a range of characters within that property. Typically, the range is indicated by a start character number and a character string length, but other encodings are possible.

2. A set of character ranges in some property of a program component: The source reference consists of a set of the character ranges just described. This allows the developer to reference noncontiguous strings of characters.

3. An entry in some Token Map 66: The source reference consists of a reference to a program component, and an indication of whether to use the Token Map 66 corresponding to the interface or implementation property of the component, and a key corresponding to the identifier of some entry in the Token Map 66.

4. A range of entries in some Token Map 66: The source reference consists of a reference to a program component, and an indication of whether to use the Token Map 66 corresponding to the interface or implementation property of the component, and a range of keys corresponding to identifiers of entries in the Token Map 66. Typically, the range is indicated by a starting token identifier and a number to tokens in the range, but other encodings are possible.

5. A set of entries in some Token Map 66: The source reference consists of a reference to a program component, and an indication of whether to use the Token Map corresponding to the interface or implementation property of the component, and a set of keys corresponding to identifiers of entries in the Token Map 66.

DATA LOCATIONS

FIG. 19 is a diagram showing the objects for conveying data locations. Data Locations 86 describe 1) the address of a data value, 2) in some particular context. The context is provided by a Data Map entry which contains the data location description. For most architectures, data locations can be described by one abstract base class and three concrete derived classes. The concrete classes are:

1. TAbsoluteAddressDataLocation: Which is constructed simply by providing an address value.

2. TExternalSymbolDataLocation: Which is constructed simply by providing a reference to a program component. The referenced component will provide a name and any other information, such as a package or library name, necessary for the Debugger to resolve the address of the referenced external symbol.

3. TRegisterIDDataLocation: Which is constructed simply by providing a target architecture-dependent register name.

Keep in mind that data locations are interpreted in some context. A context is conceptually equivalent to a list of stack frames. Each frame in the stack consists of a set of registers—including a program counter register. To find the address of an object, a frame in the list is found which contains a program counter value which corresponds to a program counter in the program counter range for a Data Map entry. A global variable is described using a program counter range which encompasses all addresses.

The appropriate contextual frame is needed only in the case of a TRegisterIDDataLocation data location, since the value for the register named for that concrete class is the value of a register associated with the contextual frame. For absolute address and external symbol data locations, the contextual frame specifies a process or thread address space.

The base TDataLocation class allows the provider to add additional steps which must be taken, starting with the address implied by one of the three concrete classes, to form the final live address of a data object. The base class allows the provider to append a list of offset and indirect operators to the address implied by the base class. So, the provider might say something like:

1) Given the address provided by the base class, add 12.
2) Given the address so far, read an address value from memory and use that new value as the address so far (i.e. perform an "indirect" operation).
3) Add 18 to the address developed so far.
4) Perform another indirect operation.

Finally, the provider can specify a bit offset to be applied to the final address. This then defines the bit address of the start of the value of the data object described.

ACCESS FORMULAS

Figure 20:
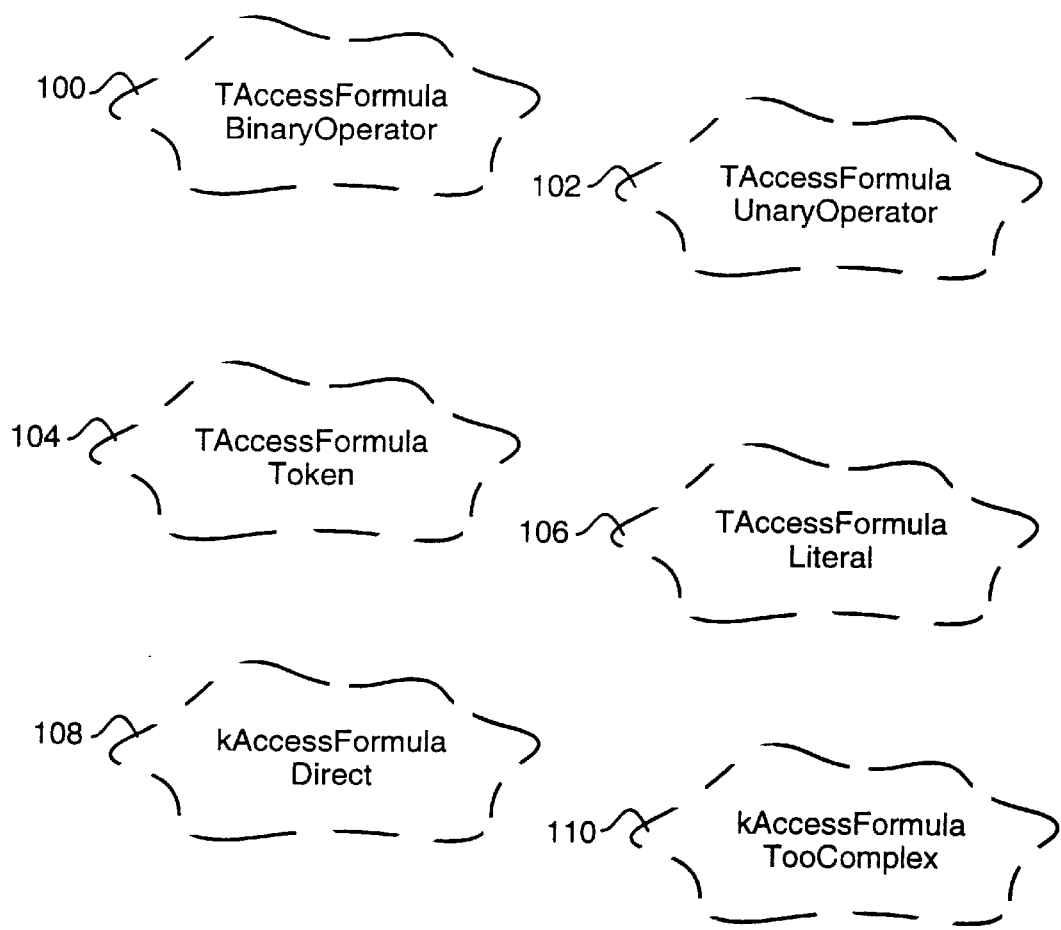
FIG. 20 shows the objects necessary for conveying access formulas.

FIG. 20 shows the objects necessary for conveying access formulas. As described in "The Data Map" section above, the value of a data object may or may not exist simply at the address given for that data object. Instead of the value for object "a", we might find that the value of "a+3" is stored in the location, or the value of an induction variable, etc. An access formula describes the steps to be performed to either extract the data object value from an address, or to build a new value from a data object to be stored at an address.

A few predefined access formulas are provided to describe common situations. The first of these is the kAccessFormulaDirect formula 108. This describes the common condition where the value is simply stored at the indicated address. The second of these is the kAccessFormulaTooComplex formula 110. This describes the situation where a variable is live, and at a known address, but the value is embedded in the value at the address in such a way that it is not practical for the provider to describe how to extract the value. For instance, the value, "a+Foo(13)" might be stored in a location described by the Data Map entry for variable "a". The Debugger couldn't determine the value of "a" in the location unless it could determine the value of the function call result, and it may not be possible for the Debugger to call the function "Foo" as the call may have side effects. In all other cases, the access formula is built from combinations of the derived classes which include, but are not limited to:

1. TAccessFormulaBinaryOperator 100: An operator is applied to a read and a write access formula operand to derive a new access formula. Operators include the expected addition, subtraction, multiplication, division, etc.

2. TAccessFormulaUnaryOperator 102: An operator is applied to an access formula operand to derive a new access formula. Operators include the expected negate, logical not, etc. as well as an "address of" operator.

3. TAccessFormulaToken 104: A reference to the value of a variable implied by the Token Map 66 entry, or the address of the variable, if an "address of" unary operator is applied to this kind of access formula.

4. TAccessFormulaLiteral 106: A reference to a self defining, literal value, such as an address, an integer, etc.

As an example, an access formula to describe how to extract the value of a loop variable from an induction variable might be constructed as follows:

1. Begin with a kAccessFormulaDirect formula 108.

2. Create a TAccessFormulaToken 104 access formula referencing the array.

3. Create a TAccessFormulaUnaryOperator 102 access formula whose operand is the access formula from step 2 above and whose operator is "address of".

4. Create a TAccessFormulaBinaryOperator 100 whose left operand is the direct access value from step 1 above, whose right operand is the value from step 3 above, and whose operator is subtract.

5. Create a TAccessFormulaLiteral 106 access formula describing the element size of the array.

6. Create a TAccessFormulaBinaryOperator 100 whose left operand is the access formula from step 4 above, whose right operand is the access formula from step 5 above, and whose operator is divide.

The access formula resulting from step 6 above would be a possible read access formula for a Data Map entry of a variable whose value was part of an induction variable.

CODE OPTIMIZATION ANNOTATIONS

FIG. 21 is a diagram showing a code optimization annotation typically used for conveying annotation information in the Database. A single Optimization Annotation class, TCodeOptimization 120, is sufficient to provide information for most common code optimizations. That class encapsulates a source reference (see "Source references" above), a cause or kind indication, and a PCAttributes value. The following shows the class constructor and the needed optimization kind enumeration:

```
enum ECodeOptimizationKind {
    kAlgebraicIdentity,
    kCommonSubExpression,
    kCommonTailMerge,
    kInlineExpansion,
    kTailRecursion,
    kTemplateInstantiation
};
TCodeOptimization
(ECodeOptimizationKind   kind,
 TSourceReference        sourceReference,
 PCAttributes                        pcAttributes);
```

The PCAttributes value is required for optimizations such as inline expansion, where there may be a new prologue and epilogue which is related to the expansion. With this Optimization Annotation and by marking the epilogue of the expansion, for instance, it becomes possible, for instance, to show the inline source equivalent when stepping into the expansion code and to allow a "run until about to return" command equivalent to occur. The Debugger would then execute until the epilogue for the expansion was about to be executed.

For the constructor shown above, if, for instance, code is merged due to a common subexpression elimination optimization, the Instruction Map entry for the resulting code sequence would have a source reference which would indicate any one of the common subexpressions which were merged, and the list of Optimization Annotations for the instruction would have source references to the other common subexpressions which were merged, with an indication that the optimization was because of common subexpression elimination (i.e., kCommonSubexpression).

For another example, if the tails of, say, the true and false parts of an if-statement were merged, then the Instruction Map entry for the resulting code sequence would have a source reference which would indicate one of the two tails which were merged, and the Optimization Annotation for the instruction would have a source reference which would indicate the other tail which was merged, and the annotation would have an indication that the optimization was because of common tail merging (i.e. kCommonTailMerge).

As a final example, if a function were inline-expanded at the point of a call, the resulting instructions would all have a source reference to the original call text, and each instruction's Optimization Annotation would have a source reference back to some statement in the inline-expanded function for which the instruction applies. The annotation would indicate an inline expansion optimization (i.e. kInlineExpansion). See "Code optimization and annotations" below for more discussion of how this annotation is used.

DATA OPTIMIZATION ANNOTATIONS

FIG. 22 is a diagram showing Data Optimization Annotation classes. Two Optimization Annotation classes are sufficient to provide information for most common data optimizations. The classes are:

1. TDataSharedOptimization 122: This describes how two or more data objects share a single live location. So, any attempt to change the value of one must change the value of the others. The class encapsulates a list of references to the other shared live location data objects and an indicator as to the type of optimization which caused the shared live location.

2. TDataConstraintOptimization 124: This describes how the value of a data object must be constrained for proper code execution. For instance, if a compiler asserts that a value is positive, and so can perform a strength reduction operation whereby a divide operator is converted to an arithmetic shiftright operator, then this class can indicate that the data value is constrained to be positive. The class encapsulates an indication of the valid range of values for the data object, and an indicator as to the type of optimization which caused the constraint.

The following shows the constructors for the various data Optimization Annotations:

```
enum EDataOptimizationKind {
    kEvenConstraint,
    kOddConstraint,
    kRangeConstraint,
    kSharedLocation
};
TDataSharedOptimization
    (TSourceReference sourcereference) ;
TDataConstraintOptimization
    (EConstraintKind predefinedKind) ;
TDataConstraintOptimization
    (signed long minConstraint, signed long
        maxConstraint) ;
TDataConstraintOptimization
    (unsigned long minConstraint, unsigned long
        maxConstraint) ;
TDataConstraintOptimization
    (double minConstraint, double maxConstraint) ;
```

CODE OPTIMIZATION AND ANNOTATIONS

Following is a brief description of several common compiler optimizations and how the Debugger information format deals with them.

1. Algebraic Identity: If a program were to contain, say, the following 4 statements:

1: a=b+c;
2: d=b−d;
3: e=c+d;
4: f=b+c;

and, ignoring, for the sake of argument, issues like possible side effects from arithmetic evaluation or operator overloading, then statements 1 and 4 are algebraically identical and no instructions for statement 4 need to be generated. The Instruction Map for the code for statement 1 would have TCodeOptimization 120 Annotations to indicate that the code also was for statement 4.

2. Algebraic simplification: When expressions are factored, such as by eliminated useless "add zero" operations, or applying associative properties to simplify an expression, no Optimization Annotation is needed. The Instruction Map is capable of describing the correct mapping without annotations.

3. Branch merging: When a branch instruction which branches to a second branch instruction is replaced with a branch instruction which branches to the target of the second branch instruction, no Optimization Annotation is needed. The Instruction Map is capable of describing the correct mapping without annotations.

4. Canonical reordering: Canonical reordering of expressions affects only the pattern matching used internally by the compiler. For instance, recognizing that the subexpression "b+e" is identical to the subexpression "e+b" for purposes of detecting common subexpressions is a form of canonical reordering. No Optimization Annotation is needed.

5. Code motion: Code motion usually involves one of two processes. In most cases, loop-invariant code is moved from within a loop to outside. In other cases, code is moved to achieve better instruction scheduling. In both cases, no Optimization Annotations are needed and the normal Instruction Map can describe the effects.

6. Common subexpression elimination: When common subexpressions are detected, a single expression result is computed and the other expression computations are replaced with a reference to the single result. Each of the instructions in the single computation would have a list of TCodeOptimization 120 Annotations which references the source of the other computations which were eliminated.

7. Common tail merging: When the tail statements of, say, the true and false parts of an if-statement are merged as being common code, a TCodeOptimization 120 Annotation for one of the tails will reference the source that is not referenced in the Instruction Map.

8. Constant folding: No Optimization Annotations are needed for constant folding. The Instruction Map is capable of mapping the resulting constant to all the text pieces that went into its computation.

9. Current value: The value for a data object may not be computed at the expected place in a code stream. Instruction scheduling may move the computation to an early position in the code stream. Use/definition analysis may allow the computation to take place in a later position. No Optimization Annotations are required to reflect this state. The normal instruction and Data Maps are sufficient to describe this affect.

10. Data constraint: If the compiler generates code based upon knowledge about a constraint in a data object's value beyond that implied by the object's type, it notes the value constraint via a TDataConstraintOptimization 124 Annotation.

11. Dead code elimination: When unreachable code is removed by the compiler, no annotations are needed. The fact that source exists which is not covered by entries in the Instruction Map is sufficient to imply that dead code was eliminated.

12. Inline expansion: When function calls are inline expanded, both code and data Optimization Annotations may be needed. The resulting code is mapped to the call in the Instruction Map, and TCodeOptimization 120 Annotations map those same instructions to statements in the inline-expanded function. Also, entries in the Data Map 70 will reference source from the inline-expanded function as function variables are mapped into the expansion. In some cases, variables in the caller code will carry over into the expansion, as when local variables are mapped into formal parameters before the expansion. In this case, a TDataSharedOptimization 122 Annotation will be needed for the Data Map 70 to indicate the other variable which is live in the location.

13. Induction variable: Sometime the value of a variable need not be kept explicitly in some memory location or a register. Instead, an expression involving the variable is kept. The actual value of the variable must be "inferred" from the expression value. The effects of this optimization are handled by read/write access formulas in the Data Map 70.

14. Instruction scheduling: This is covered by the discussion of code motion above.

15. Loop unrolling: In loop unrolling, a loop which would normally be executed "n" times is converted into a loop which is executed fewer times by concatenating the loop body multiple times. For instance, instead of executing a loop body 8 times, and doing 8 branches back to the beginning of the loop, the code could be replaced with a loop that executed 4 copies of the body and execute that code only twice—eliminating costly branches. No Optimization Annotations are required to describe this optimization. The Instruction Map is allowed to map a multiple instructions to the same source reference. Note that the statement map for a statement which has been copied may need multiple breakpoint locations to indicate that multiple copies of the statement exist.

16. Reduction in strength: Sometimes a compiler will replace relatively expensive instructions, such as a divide, by less expensive instructions, such as a shift. No Optimization Annotations are needed to deal with this optimization unless data constraints drove the optimization, as discussed in earlier examples. In that case a TDataConstraintOptimization annotation is needed.

17. Shared location: Sometimes a compiler will determine that two or more data objects are semantically equivalent over some range of code and use a single live location to contain both objects. The TDataSharedOptimization 122 annotation describes the effect of this sharing.

18. Tail recursion elimination: When the last statement in the some control flow for a function recursively calls the same function, the compiler will sometimes replace that call with a less expensive branch which will then reuse the same stack frame. Some instruction in the code sequence which set's up the frame for reuse should have a TCodeOptimization 120 Annotation which maps to the function name and indicates that tail recursion optimization has been applied. The Debugger can use this information to create virtual stack frames to fill in for the reused frames when viewing the list of stack frames for a program.

19. Template instantiation: The effects of template instantiation are not handled by Optimization Annotations. The affected maps merely reference the appropriate source text, which may or may not be in the same component as the map itself.

EXAMPLES

The following examples provide a few specific failings of popular debugging information formats. Consider Dwarf2 and XCOFF.

Variable Definitions

Variable definitions describe the variable's location in an executing program. Dwarf2 references variables by pointing at their first character position in a source component. There is no additional information to aid in name resolution. For instance, using just debugging information from Dwarf2, a developer could not point at an arbitrary token in a source program and determine its semantic resolution. A developer could not determine if two variables having the same string name were semantically the same variable. This is even more problematic when dealing with templates, where a token can have more than one semantic resolution (i.e. the local resolution in the template body, and a resolution due to parameter substitution when the template is instantiated). A C++ template is a generalized pattern for producing code, like a cookie mold in a kitchen. A user instantiates a template by providing details for turning a generalized class into a specific object tailored to the user's specifications.

With XCOFF, the problem is even greater as only the string name of a variable is captured, with no indication of where that string comes from in the source program.

The information used by the Debugger of the present invention includes Token Maps, which show semantic resolution information for variables, and Statement Maps, which show how variables are used in declarations and statements. The data base used by the present invention also provides Usage and Definition Links, allowing a developer to find all places where a variable is used, or where the definition point is for a variable.

Variable Access

Variable access is a description of where a variable's value is located and how to extract it from a register value or a value in memory. In XCOFF, a variable must be live in a single site (e.g. a register or memory location) through a whole function. A variable's value must be solely contained in the site—it can't be part of an expression value in the site. No optimization information can be used to describe any optimization information know to the compiler.

In Dwarf2, variables can be live in multiple sites, but they still must be solely contained in the site and no optimization information can be described.

The Debugging System disclosed herein provides information in the Data Map 70 which instantiates variables to be in multiple sites, for the value to be embedded in an expression, and for optimization information to be supplied. For example, for the code fragment:

```
int a[13] ;
for (int i = 0; i < 13; i++)
    a[i] = a[i] +i ;
``` the value of variable "i" may not exist by itself. With the optimization of induction variable generation, a register may contain the value of "address of a [i]" instead. The value of "i" could be determined by taking the value of that register, subtracting the base address of array "a", and dividing by the element size of array "a". The Data Map 70 utilized as part of the present invention allows such a description.

The Debugger Data Map 70 of the present invention provides for Optimization Annotations to describe how two variables in a source program are treated as semantically equivalent by the compiler for some range of code, so any change in the value of one necessarily changes the value of the other.

The map also provides for the compiler to describe value constraints of a variable. For instance, a compiler might have "proved" that a variable's value in the source is positive at some point, and convert a divide by 4 operation into an arithmetic shift right operation (a reduction in strength optimization). The compiler can indicate that the variable's value for some code range must be positive for the generated code to work correctly.

Instruction to Source Mapping

Both XCOFF, and Dwarf2 use source to instruction maps. That is, a line in the source program is mapped to an instruction in the code. XCOFF does not describe the possibility of more than one statement on a line. Neither format allows for describing the effects of optimizations, such as common subexpression elimination. Both formats assume a single return point for a function.

The Debugger information format of the present invention maps instructions to source code. The source code reference can be in many forms, such as a range of characters, a reference to a token, a set of character ranges, a set of tokens, or a range of tokens. So, optimizations such as common subexpression elimination, where a single instruction may relate to several text strings, are easily described.

Both XCOFF, and Dwarf2 assume a contiguous set of instructions in the prologue and epilogue of a function. The Debugger information format of the present invention allows each instruction to be marked if it is part of the prologue or epilogue. Further, each instruction can be marked to indicate whether or not a frame exists at that location—information useful in stack walking and determining the context of a user's request.

XCOFF cannot deal with the effects of instruction scheduling in any useful way. Dwarf2 allows for a line to map to multiple discontiguous sets of instructions, as a developer would see with instruction scheduling, but it has no way of indicating which instruction corresponds to the "breakpoint" location equivalent of any particular statement. The Debugger information format of the present invention allows the compiler to specify the "best" breakpoint location for a statement or even parts of statements, such as expressions and subexpressions.

XCOFF deals only with lines of source code. Dwarf2 can, by implication, deal with smaller pieces of a line, but there is no way to indicate what semantic component the piece represents, such as a statement, expression, or subexpression. Further, Dwarf2 does not describe which pieces of source text correspond to the line piece. The Debugger Statement Map 68 of the present invention allows any piece or set of pieces of source text to be described. Further, the Statement Map entries can correspond to subexpressions, expressions, statements, functions, or any other language-extensible component.

Templates and Generics

A generic is another way of referring to a template. XCOFF has no provisions for describing the effects of template or generic instantiation. Dwarf2 has a basic capability to describe the instantiation, but has no provision for allowing, say, setting a breakpoint in a template function and having it apply to all instantiations of the template.

The Debugger Project Database of the present invention coupled with the Debugger Information allows debugging templates in both their abstract and instantiated forms.

Inlines

Inlines improve execution by copying a subroutine's logic (source statements) inline to reduce the overhead associated with branching to the subroutine and returning from the subroutine.

XCOFF has no ability to describe inline expansions. Dwarf2 has some ability to describe the effects of inline expansions, but cannot deal with most code optimizations.

With the Debugger information format of the present invention, the maps can describe code generation and the effects of optimization from more than one viewpoint. For instance, if a developer has a function call like, "i=Foo (3)", an instruction involved in the call can be mapped both to the "Foo (3)" text at the call site, and to one or more pieces of text in Foo's body which is inlined expanded. Further, with the Debugger Project Database of the present invention, it is possible, say, to set a breakpoint for a statement in a function and have that breakpoint apply to all inline expansions of that function.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is as follows:

1. An apparatus for use on a computer system having an operating system thereon, the apparatus controlling an executable program having executable code lines created by processing source code lines with a compiler to generate object code modules and linking the object code modules with a linker, wherein the compiler and the linker generate debugging information during processing, the apparatus comprising:
    (a) a database creator which is responsive to the debugging information for creating an information database containing a plurality of map entries defining particular relationships between the source code lines and the executable code lines and methods for accessing data variable locations;
    (b) a plurality of software model objects modeling the executable program and the operating system, the software model objects containing data and code therein for generating state data concerning the state of the executable program and the operating system; and
    (c) a debugger engine which is responsive to the state data generated by the plurality of software model objects for examining the information database to control the computer to selectively execute the executable program.

2. The apparatus of claim 1, wherein said information database comprises at least one instruction map comprising one or more instruction map entries for mapping at least one executable code line to one or more source code line selections.

3. The apparatus of claim 1, wherein said information database comprises instruction index range information for providing information regarding an range of source code lines associated with a map entry.

4. The apparatus of claim 1, wherein said information database comprises source reference information for providing information regarding source code lines associated with a map entry.

5. The apparatus of claim 4, wherein said source reference information comprises information defining source references in terms of portions of source code lines.

6. The apparatus of claim 1, wherein said information database comprises data optimization annotation for providing information regarding implications of code optimization.

7. The apparatus of claim 6, wherein said data optimization annotation indicates shared lifetime.

8. The apparatus of claim 6, wherein said data optimization annotation indicates constraint.

9. The apparatus of claim 6, wherein said data optimization annotation indicates inline expansion optimization.

10. The apparatus of claim 1, wherein said information database comprises code optimization annotation for providing information regarding implications of code optimization.

11. The apparatus of claim 1, wherein said information database comprises attribute information for providing information regarding source position.

12. The apparatus of claim 11, wherein said information regarding source position comprises function information.

13. The apparatus of claim 11, wherein said information regarding source position comprises frame construction information.

14. The apparatus of claim 11, wherein said information regarding source position comprises characteristic location information.

15. The apparatus of claim 1, wherein the compiler and the linker comprise information providers and wherein the apparatus further comprises an adopt function for asking the database creator to adopt a format of information of an information provider.

16. The apparatus of claim 1, wherein said information database comprises at least one token map comprising one or more token map entries for mapping a token from token map entry to a source code line selection.

17. The apparatus of claim 1, wherein said information database comprises at least one source reference for defining a source of a token.

18. The apparatus of claim 1, wherein said information database comprises at least one kind indicator for defining a kind of a token.

19. The apparatus of claim 1, wherein said information database comprises at least one data indicator for defining an entry into a type map which defines a type of token.

20. The apparatus of claim 1, wherein said information database comprises at least one data indicator for defining an entry into a data map entry associated with a token.

21. The apparatus of claim 1, wherein said information database comprises at least one statement map comprising one or more statement map entries for mapping source code lines to a hierarchy of semantic statement elements.

22. The apparatus of claim 1, wherein said information database comprises at least one source reference for defining a source of a statement element.

23. The apparatus of claim 1, wherein said information database comprises at least one kind indicator for defining a kind of a statement element.

24. The apparatus of claim 1, wherein said information database comprises at least one parent indicator for defining a parent of a statement element.

25. The apparatus of claim 1, wherein said information database comprises at least one breakpoint indicator for defining one or more breakpoints related to a statement element.

26. The apparatus of claim 1, wherein said information database comprises at least one data map comprising data map entries for mapping data variable locations to one or more source code lines.

27. The apparatus of claim 1, wherein said information database comprises at least one variable indicator for defining a variable in one of the source code lines.

28. The apparatus of claim 1, wherein said information database comprises at least one source reference for defining a source of a data object defined by an associated map entry.

29. The apparatus of claim 28, wherein said source reference comprises at least one range of characters.

30. Th e apparatus of claim 28, wherein said source reference comprises at least one set of character ranges.

31. The apparatus of claim 28, wherein said source reference comprises at least one reference to a token in a token map.

32. The apparatus of claim 28, wherein said source reference comprises at least one set of tokens.

33. The apparatus of claim 28, wherein said source reference comprises at least one range of entries in a token map.

34. The apparatus of claim 1, wherein said information database comprises at least one live location reference for defining a formula which, when used in a context of an executing program, specifies a data location of a data object defined by an associated map entry.

35. The apparatus of claim 34, wherein said live location reference comprises an absolute address.

36. The apparatus of claim 34, wherein said live location reference comprises a program component reference.

37. The apparatus of claim 34, wherein said live location reference comprises a register reference.

38. The apparatus of claim 1, wherein said information database comprises at least one accessing formula defining a value at an address associated with a map entry.

39. The apparatus of claim 38, wherein said accessing formula comprises at least one read accessing formula for defining how to read a value associated with a map entry.

40. The apparatus of claim 38, wherein said accessing formula comprises at least one write accessing formula for defining how to create a value associated with a map entry.

41. The apparatus of claim 38, wherein said accessing formula comprises information defining a value at an address.

42. The apparatus of claim 38, wherein said accessing formula comprises information defining a variable embedded in value at location specified.

43. The apparatus of claim 38, wherein said accessing formula comprises information defining an operator applied to left and right access formula to create new access formula.

44. The apparatus of claim 38, wherein said accessing formula comprises information defining an operator applied to access formula to create new access formula.

45. The apparatus of claim 38, wherein said accessing formula comprises information defining an address of a unary operator which is applied to access formula to derive a value which is a variable.

46. The apparatus of claim 38, wherein said accessing formula is implied by either a token map entry or an address of a variable.

47. The apparatus of claim 38, wherein said accessing formula comprises a reference to a self-defining literal value.

48. The apparatus of claim 42, wherein said accessing formula comprises a reference to a value directly located at an address.

49. The apparatus of claim 42, wherein said accessing formula comprises a formula describing a condition wherein a value contained in a location in such a way that the value is too complex to describe how to extract the value.

50. The apparatus of claim 1 wherein the information database comprises instruction maps containing instruction map entries defining particular relationships between the source code lines and the executable code lines and data maps containing data map entries having methods therein for accessing data variable locations.

51. The apparatus of claim 50 wherein the instruction map entries comprise a plurality of software code objects, the software code objects having data and software code therein for identifying selected source code lines.

52. The apparatus of claim 1 wherein the data map entries comprise a plurality of software code objects, the software code objects having data and software code therein for locating selected data variables.

53. The apparatus of claim 1 wherein the software model objects include a software model object for modeling the state of the executable program.

54. The apparatus of claim 1 wherein the software model objects include a software model object for modeling an instruction set used in the computer and operating system services used by the executable program.

55. A method for use on a computer system having an operating system thereon, the method controlling an executable program having executable code lines created by processing source code lines with a compiler to generate object code modules and linking the object code modules with a linker, wherein the compiler and the linker generate debugging information during processing, the method comprising the steps of:

(a) using the debugging information to create an information database containing a plurality of map entries defining particular relationships between the source code lines and the executable code lines and methods for accessing data variable locations;

(b) constructing a plurality of software model objects to model the executable program and the operating system, the software model objects containing data and code therein for generating state data concerning the state of the executable program and the operating system; and (c) using the state data generated by the plurality of software model objects and information extracted from the information database to control the computer to selectively execute the executable program.

56. The method of claim 55 wherein step (a) comprises the steps of:

(a1) creating instruction maps containing instruction map entries defining particular relationships between the source code lines and the executable code lines and data maps containing data map entries having methods therein for accessing data variable locations.

57. The method of claim 56 wherein step (a1) comprises the step of:

(a1a) creating instruction map entries comprising a plurality of software code objects, the software code objects having data and software code therein for identifying selected source code lines.

58. The method of claim 56 wherein step (a1) comprises the step of:

(a1b) creating data map entries comprising a plurality of software code objects, the software code objects having data and software code therein for locating selected data variables.

59. The method of claim 55 wherein step (b) comprises the step of:

(b1) creating a software model object for modeling the state of the executable program.

60. The method of claim 55 wherein step (b) comprises the step of:

(b2) creating a software model object for modeling an instruction set used in the computer and operating system services used by the executable program.

61. A computer program product for use on a computer system having a memory and an operating system, the computer program product controlling an executable program having executable code lines created by processing source code lines with a compiler to generate object code modules and linking the object code modules with a linker, wherein the compiler and the linker generate debugging information during processing, the computer program product comprising a computer usable medium having computer readable program code thereon including:

(a) program code which uses the debugging information to create in the memory an information database containing a plurality of map entries defining particular relationships between the source code lines and the executable code lines and methods for accessing data variable locations;

(b) program code for constructing in the memory a plurality of software model objects to model the executable program and the operating system, the software model objects containing data and code therein for generating state data concerning the state of the executable program and the operating system; and (c) program code loadable into the memory which uses the state data generated by the plurality of software model objects and information extracted from the information database to control the computer to selectively execute the executable program.

62. The computer program product of claim 61 wherein the program code which creates the information database creates in the memory instruction maps containing instruction map entries defining particular relationships between the source code lines and the executable code lines and further creates data maps containing data map entries having methods therein for accessing data variable locations.

63. The computer program product of claim 62 wherein the program which creates the instruction map entries creates in the memory a plurality of software code objects, the software code objects having data and software code therein for identifying selected source code lines.

64. The computer program product of claim 62 wherein the program which creates the data map entries creates in the memory a plurality of software code objects, the software code objects having data and software code therein for locating selected data variables.

65. The computer program product of claim 61 wherein the program code which creates the software model objects creates a software model object for modeling the state of the executable program.

66. The computer program product of claim 61 wherein the program code which creates the software model objects creates a software model object for modeling an instruction set used in the computer and operating system services used by the executable program.

* * * * *